US008396840B1

(12) United States Patent
McHugh et al.

(10) Patent No.: US 8,396,840 B1
(45) Date of Patent: Mar. 12, 2013

(54) SYSTEM AND METHOD FOR TARGETED CONSISTENCY IMPROVEMENT IN A DISTRIBUTED STORAGE SYSTEM

(75) Inventors: Jason G. McHugh, Seattle, WA (US); Eric Yves Theriault, Seattle, WA (US); Seth W. Markle, Seattle, WA (US); Michael A. Uhlar, Sammamish, WA (US); Alyssa H. Henry, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 155 days.

(21) Appl. No.: 12/888,356

(22) Filed: Sep. 22, 2010

(51) Int. Cl.
*G06F 17/30* (2006.01)
(52) U.S. Cl. .................. 707/690; 707/689
(58) Field of Classification Search ................ 707/687, 707/688, 690, 691, 689
See application file for complete search history.

(56) References Cited

U.S. PATENT DOCUMENTS

| 5,701,464 | A * | 12/1997 | Aucsmith | 1/1 |
| 6,098,078 | A * | 8/2000 | Gehani et al. | 707/610 |
| 6,434,662 | B1 * | 8/2002 | Greene et al. | 711/108 |
| 6,597,700 | B2 * | 7/2003 | Golikeri et al. | 370/401 |
| 6,920,477 | B2 * | 7/2005 | Mitzenmacher | 709/203 |
| 7,277,905 | B2 * | 10/2007 | Randal et al. | 707/648 |
| 7,324,999 | B2 * | 1/2008 | Judd | 707/690 |
| 7,366,740 | B2 * | 4/2008 | Sleeman et al. | 707/691 |
| 7,506,011 | B2 * | 3/2009 | Liu et al. | 1/1 |
| 7,743,013 | B2 * | 6/2010 | Mityagin et al. | 1/1 |
| 7,765,187 | B2 * | 7/2010 | Bergant et al. | 707/614 |
| 7,769,722 | B1 * | 8/2010 | Bergant et al. | 707/681 |
| 7,822,721 | B2 * | 10/2010 | Brunnabend et al. | 707/690 |
| 8,037,023 | B2 * | 10/2011 | Liu et al. | 707/613 |
| 2009/0300022 | A1 * | 12/2009 | Little | 707/10 |
| 2010/0228701 | A1 * | 9/2010 | Harris et al. | 707/683 |
| 2011/0099187 | A1 * | 4/2011 | Hansen | 707/769 |
| 2011/0219106 | A1 * | 9/2011 | Wright | 709/223 |
| 2011/0219205 | A1 * | 9/2011 | Wright | 711/206 |

* cited by examiner

*Primary Examiner* — John E Breene
*Assistant Examiner* — Evan Aspinwall
(74) *Attorney, Agent, or Firm* — Robert C. Kowert; Meyertons, Hood, Kivlin, Kowert & Goetzel, P.C.

(57) ABSTRACT

Embodiments may include a consistency measurement component that utilizes memory-efficient sets (e.g., Bloom filters) to generate consistency metrics for read operations performed on different replicated data objects of distributed storage system. Based on the consistency metrics, the consistency measurement component may identify a subset of replicated data objects associated with low levels of consistency. The consistency measurement component may target this subset for consistency improvement by generating instructions to improve the consistency of the subset. In other cases, the consistency measurement component may notify a consistency improvement component about the targeted subset. In response, the consistency improvement component may generate instructions to improve the consistency of the targeted subset.

27 Claims, 14 Drawing Sheets

| <TXN_TS> | <TXN_type> | <key> | <last_mod_TS> |
|---|---|---|---|
| t1 | WRITE | k1 | n/a |
| t2 | WRITE | k2 | n/a |
| t3 | READ | k1 | t1 |
| t4 | WRITE | k3 | n/a |
| t5 | WRITE | k1 | n/a |
| t6 | READ | k1 | t1 |
| t7 | WRITE | k2 | n/a |
| t8 | WRITE | k2 | n/a |
| t9 | READ | k2 | t8 |
| t10 | READ | k1 | t5 |
| t11 | WRITE | k3 | n/a |
| . | . | . | . | sampled log file 116

$T_W = (n)*(T_F)$

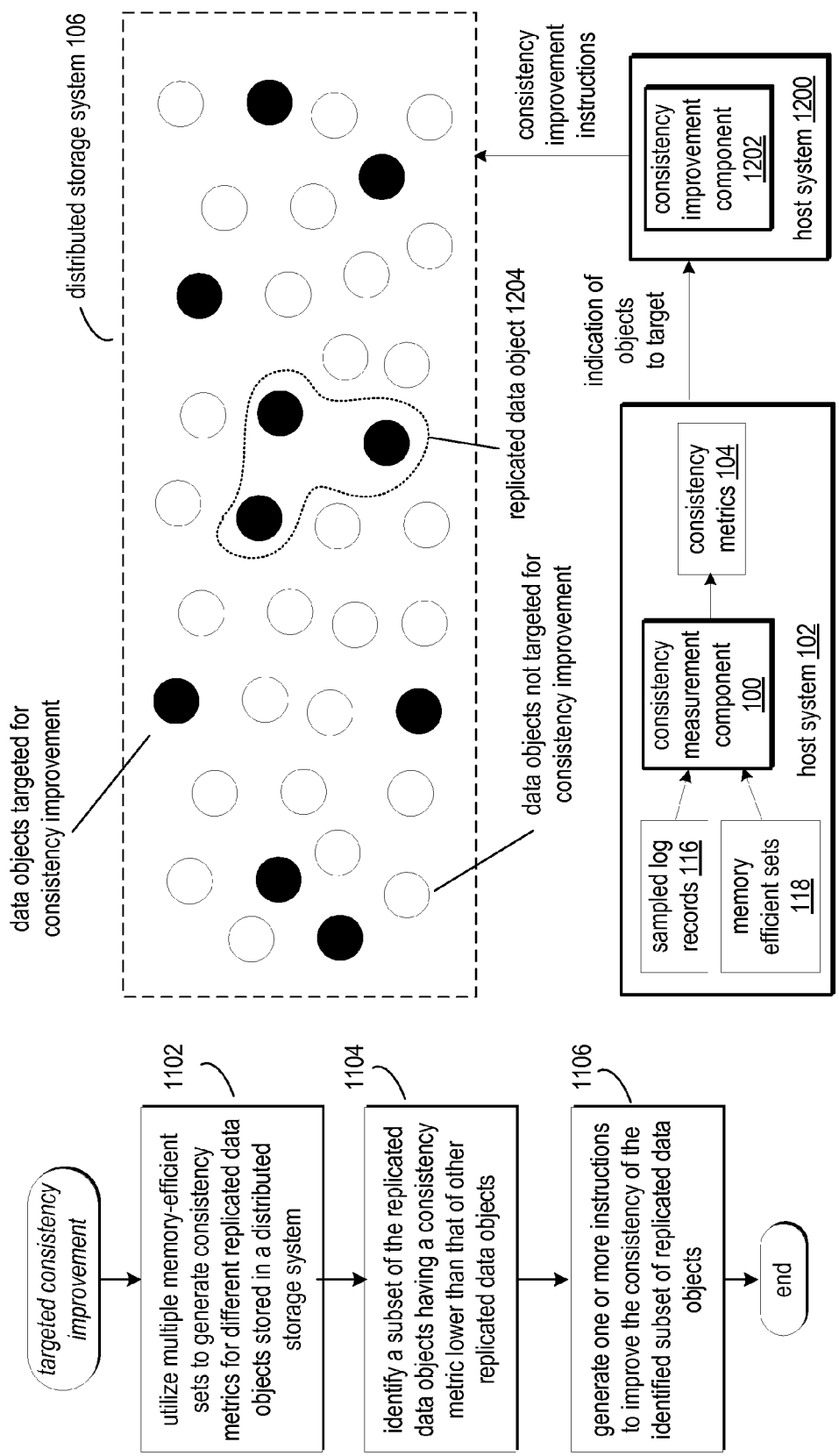

US 8,396,840 B1

SYSTEM AND METHOD FOR TARGETED CONSISTENCY IMPROVEMENT IN A DISTRIBUTED STORAGE SYSTEM

BACKGROUND

Distributed data stores often utilize data redundancy to provide reliability. For instance, multiple instances of the same data object may be stored on different storage devices. If a storage device failure causes the loss of one instance of the data object, other instances of the data object may be stored safely on storage devices that have not failed. In some cases, distributed data stores may provide data resilience by storing multiple instances of the same data object in geographically diverse locations. For instance, data objects may be replicated across different data centers in different regions. In these cases, data objects at one data center should be isolated from a disaster at another data center and vice versa.

Various properties are used to characterize distributed systems, such as the availability of data from the distributed system and the consistency of data within the distributed system. Typically, consistency and availability within a distributed data store are subject to the constraints of the CAP theorem (also known as Brewer's theorem), which generally states that distributed systems can provide one but not both of availability guarantees and consistency guarantees in the presence of network partitioning. With respect to availability and consistency, architects of distributed systems typically choose to prioritize one over the other. A high level of availability can be provided at the expense of full consistency; a high level of consistency can be provided at the expense of complete availability.

BRIEF DESCRIPTION OF THE DRAWINGS

FIG. 11 illustrates a flowchart of an example method for targeted consistency improvement, according to some embodiments.

FIG. 12 illustrates a block diagram of the components utilized to perform targeted consistency improvement, according to some embodiments.

While the system and method for targeted consistency improvement in a distributed storage system is described herein by way of example for several embodiments and illustrative drawings, those skilled in the art will recognize that the system and method for targeted consistency improvement in a distributed storage system is not limited to the embodiments or drawings described. It should be understood, that the drawings and detailed description thereto are not intended to limit the system and method for targeted consistency improvement in a distributed storage system to the particular form disclosed, but on the contrary, the intention is to cover all modifications, equivalents and alternatives falling within the spirit and scope of the system and method for targeted consistency improvement in a distributed storage system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
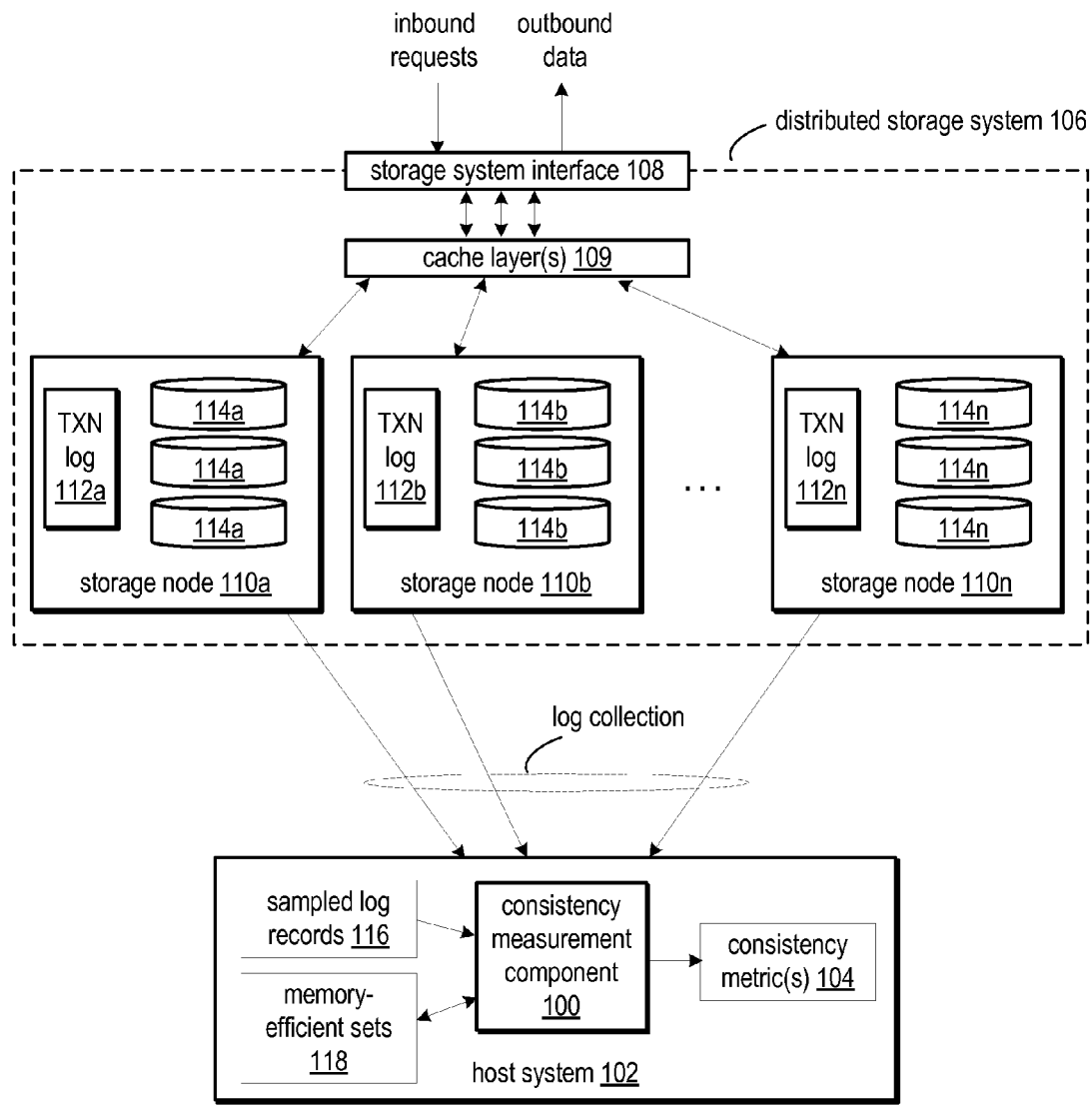
FIG. 1 illustrates a block diagram including an example distributed storage system and an example system including a consistency measurement component, according to some embodiments.

Various embodiments of a system and method for targeted consistency improvement in a distributed storage system are described. FIG. 1 illustrates one example of a distributed data storage system, denoted as distributed storage system 106. In the illustrated embodiment, distributed storage system 106 may include multiple storage nodes 110a-110n. In general, distributed storage system 106 may include any quantity of such storage nodes. In various embodiments, a storage node may be implemented by a computer or any other electronic device configured to store data; an example of such a computer is illustrated by computer system 1400 of FIG. 14 described below. In various embodiments, at least some of the storage nodes may reside in different geographic locations, such as to provide data resilience in the event of a node failure.

Each storage node may include one or more storage devices, such as storage devices 114a-n. Note that while storage devices of a given storage node are illustrated with common numerals, these storage devices need not be the same. In various embodiments, storage devices 114a-n may include hard disk drive devices, such as Small Computer System Interface (SCSI) devices or AT Attachment Packet Interface (ATAPI) devices (which may also be known as Integrated Drive Electronics (IDE) devices).

However, storage devices 114a-n may encompass any type of mass storage device including magnetic- or optical-medium-based devices, solid-state mass storage devices (e.g., nonvolatile- or "Flash"-memory-based devices), magnetic tape, etc. The storage devices may store data objects input into the distributed storage system 106. These data objects may be replicated across the storage devices of different storage nodes, such as to provide data reliability through redundancy.

Clients systems may access distributed storage system 106 through storage system interface 108, which may be implemented on one or more computer systems. As illustrated, the storage system interface may process inbound requests, which may be received from one or more clients of the distributed storage system 106. In various embodiments, these clients may be remote computers that rely on distributed storage system 106 as an offsite storage solution. Examples of inbound requests include requests to write data objects to the distributed storage system 106, delete data objects within the distributed storage system 106, and read data objects from the distributed storage system 106. Distributed storage system 106 may perform various operations in response to the inbound requests. For example, in response to a request to write data, distributed storage system 106 may perform a write operation that generates or updates a replicated data object that represents the data sent with the request. In general, a replicated data object may collectively refer to multiple instances of the same data object stored within the distributed storage system 106. In another example, in response to a delete request, distributed storage system 106 may perform a delete operation on a replicated data object within the distributed storage system 106. In some cases, this delete operation may be a special case of the write operation described above. For instance, deleting a replicated data object may include using a write operation to write a certain value to the replicated data object or to set a delete flag associated with that object. In general, it should be understood that any reference herein to a write operation (or a "WRITE") may include delete operations, modification operations, and/or any type of mutation operation that can affect the data of replicated data objects. Outbound data may include responses to inbound requests, such as data objects read and/or request acknowledgements. For example, in response to a read request, distributed storage system 106 may locate the respective data object, retrieve a value from that data object, and return the value to the requestor. In various embodiments, inbound requests and/or outbound data may be communicated over one or more electronic networks configured to transport data, an example of which is described below with respect to network 1485 of FIG. 14.

In various embodiments, the distributed storage system may include one or more cache layers 109, which may cache (e.g., store) instances of data objects from lower levels of the distributed storage system (e.g., storage nodes 110*a-n*). In various embodiments, one or more of these caching layers may be utilized to increase performance of the distributed storage system. In some embodiments, cache layers may be implemented on one or nodes, each node being implemented as a computer (e.g., similar to computer system 1400 of FIG. 14).

In various embodiments, each storage node may maintain a respective transaction ("TXN") log 112*a-n*. The transaction log of a given storage node may include a record of each operation (e.g., read operations and write operations) performed by the given storage node. As described in more detail below with respect to subsequent Figures, these logs may also include other information, such as timestamps indicating when certain operations were performed.

It should be noted that distributed storage system 106 of FIG. 1 is a non-limiting example of the types of distributed storage systems that may be implemented in various cases. The consistency measurement component described herein may measure the consistency of distributed storage system similar to distributed storage system 106 as well as distributed storage systems adhering to other configurations. Also note that in various embodiments logs of the distributed storage system may be stored in other locations than those illustrated as well as accessible from other locations of the distributed storage system. In one non-limiting example, logs may be stored as part of storage system interface 108 and/or may be accessible through storage system interface 108. In some embodiments, storage models other than those illustrated and described may be utilized. For instance, in some cases, any of nodes 110*a-n* may be relational database management systems (RDBMS). Generally, the consistency measurement techniques described herein may be utilized independent of any specific storage model.

Various embodiments may include a consistency measurement component 100, which may be configured to measure the consistency of replicated data objects stored in distributed storage system 106. Consistency measurement component 100 may be configured to collect log files from the various storage nodes of distributed storage system 106, as illustrated by the "log collection" of FIG. 1. As described in more detail herein, consistency measurement component 100 may utilize multiple memory-efficient sets 118 to analyze information from the logs in order to generate one or more consistency metrics 104. Consistency measurement component 100 may be implemented on a host system 102, which may be implemented by a computer system (e.g., computer system 1400 of FIG. 14).

While embodiments are largely described herein within the context of a system that processes batches of logs collected from the distributed storage system, embodiments are not limited to operating in this manner. For instance, in some embodiments, logs may be collected and analyzed by consistency metric component 100 in real-time or near real-time. In yet other cases, the information described as being collected in the form of logs (e.g., information specifying the operations performed in the distributed storage system) may instead be streamed directly from the distributed storage system to the consistency metric component. In some embodiments, this streamed data may be evaluated in real-time or near-real time to determine inconsistencies. It should be understood that embodiments are not limited to any of these techniques. In various embodiments, any technique for determining the operations performed in the distributed storage system may be utilized.

In various embodiments, replicated data objects may be identified within the distributed storage system 106 using a key. Generally speaking, keys may include alphanumeric strings or other types of symbols that may be interpreted within the context of the namespace of the distributed storage system 106 as a whole, although keys may be interpreted in different ways. Generally speaking, a key may persist as a valid identifier through which a client may access a corresponding replicated data object as long as that object exists within the distributed storage system 106.

In various embodiments, the logs collected by consistency measurement component 100 may be sampled. These sampled log records are illustrated as sampled log records 116, which may be stored in memory of host system 102. In various embodiments, sampling the log records may reduce the computing resources and/or time needed to generate consistency metrics 104. In various embodiments, a requisite number of log records may be sampled in order to provide statistically significant values for consistency metrics 104. Techniques for sampling are described in more detail below with respect to FIG. 3.

Consistency measurement component 100 may utilize memory-efficient sets 118 to store temporal indications that specify when different write operations were performed. In some embodiments, the memory efficiency of a memory-efficient set may stem from the set having limited removal characteristics and probabilistic guarantees of correctness. One example of a memory-efficient set is a Bloom filter. Generally speaking, Bloom filters are data structures that are configured to specify which elements are currently members of a set (with some chance of a false positive, described below). For example, given a key (or other identifier), the Bloom filter may be tested or probed to determine whether that key has already been inserted into the Bloom filter. In this example, the members of the Bloom filter's set include the keys that have already been inserted into the Bloom filter. Typically, once a key is inserted into the Bloom filter, it cannot be removed (although some embodiments may utilize sets that allow key removal). These types of Bloom filters may be utilized to answer a query that asks "is key k1 a member of the set of keys that have been inserted?" but not a query that asks "what are the values of the keys that have been inserted?". Examples of Bloom filters are described in more detail below. In general, the memory-efficient sets described herein may be configured to provide an indication of which keys have been inserted into that set.

In various embodiments, the memory-efficient sets described herein may be any data structure that tracks the constituency of a set while displacing a data footprint that is less than the data footprint that would be required to store the actual values of the constituents of that set. This may be achieved through a variety of techniques (e.g., hashing into a bit array), examples of which are described with respect to subsequent Figures.

As described in more detail below, consistency measurement component 100 may utilize memory-efficient sets 118 to categorize different write operations into different time periods. For instance, consistency measurement component 100 may insert write operations specified by sampled log records 115 into different sets assigned to different time periods. Consistency measurement component 100 may also compare read operations from sampled log records to the sets in order to generate consistency metrics 104. For a given set of read operations from sampled log records 116, consistency metrics 104 may indicate a measurement or estimation of how consistent those read operations were. Generally, for each individual read operation that is sampled, consistency measurement component 100 may determine whether that read operation was consistent. For a given group of read operations, a consistency metric may depend on the quantity of those read operations that resulted in an inconsistent read. Situations in which inconsistent reads may occur are described in more detail below with respect to FIG. 2.

Figure 2:
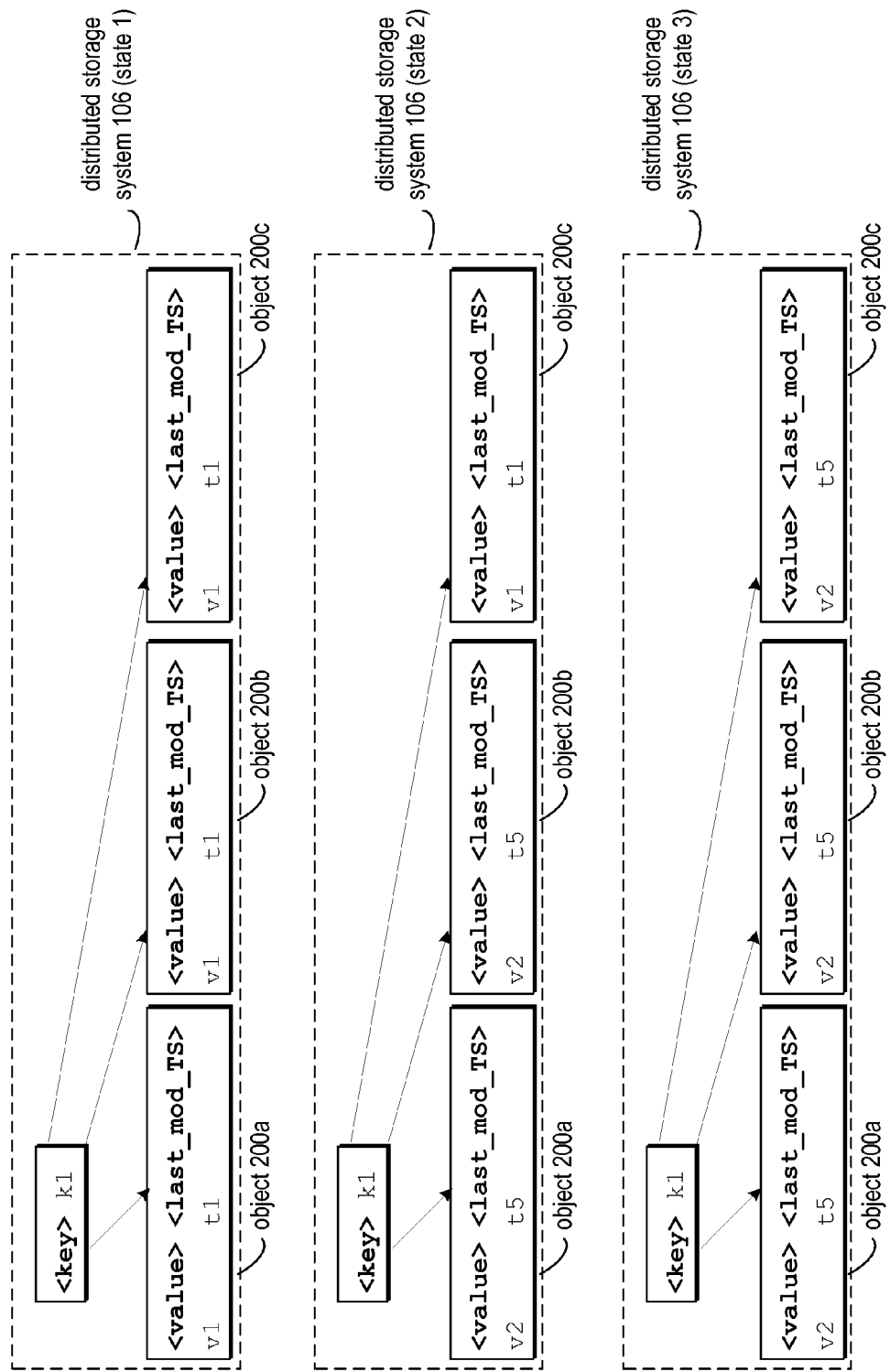
FIG. 2 illustrates a block diagram of a replicated data object in three different states, according to some embodiments.

FIG. 2 illustrates a scenario in which an inconsistent read may occur. In the illustrated embodiment, three example states of distributed storage system 106 are shown. In each state, multiple stored instances of the same replicated data object are illustrated as objects 200a-c, which may be referred to collectively as replicated data object 200. For clarity of illustration, only replicated data object 200 is shown in each system state of FIG. 2. In general, distributed storage system 106 may store any number of replicated data objects subject to the collective storage capacity of storage devices 114a-n. Also for clarity of illustration, storage nodes are not shown; it should be understood that objects 200a-c may be stored on different storage nodes within distributed storage system 106.

In various embodiments, for each replicated data object, distributed storage system 106 may maintain a corresponding key that maps to each stored instance of that data object. In the illustrated embodiment, replicated data object 200 includes three stored instances; key k1 maps to each of the stored instances illustrated as objects 200a-c. In various embodiments, a replicated data object's key may be the primary identifier utilized to identify and/or locate all stored instances of the same replicated data object. In some embodiments, distributed storage system 106 may utilize a key map that maps keys to the respective memory locations at which objects are stored (although this is not required in all embodiments).

In various embodiments, each object may include a value that may be written to or read from the object. In some embodiments, each data object may also include various metadata. In the illustrated embodiment, an example of such metadata is shown as a time stamp (denoted as "last_mod_TS"). In various embodiments, for a given data object, this time stamp may indicate the last time that the value within that data object was modified. For instance, distributed storage system 106 may update such a time stamp within a data object each time a value is written to that data object (or when any other modification is performed to that data object). In other cases, other types of metadata may be stored within the data objects.

In state 1 of FIG. 2, replicated data object 200 is consistent as each data object 200a-c includes the same value v1. In state 1, the metadata ("last_mod_TS") of each object 200a-c indicates that each of the objects was last modified at the same time t1. If distributed storage system 106 were to perform a read operation at state 1, the read operation would be consistent independent of which set of storage systems is used. For instance, irrespective of which data object 200a-c that the distributed storage system 106 targets during the read operation, the value retrieved will be the most recent value written to replicated data object 200, namely value v1.

State 2 of FIG. 2 represents distributed storage system 106 after receiving and partially processing an inbound write request targeting replicated data object 200. In the illustrated example, distributed storage system 106 has received an inbound request to write value v2 to the replicated data object identified by key k1 (i.e., replicated data object 200). In state 2, distributed storage system 106 has updated objects 200a and 200b with a write operation whereas object 200c has not yet been updated. Accordingly, value v2 is present within object 200a and object 200b, but not object 200c. Additionally, distributed storage system 106 has updated the last-modified timestamp of objects 200a and 200b to t5 (where t5 is some time after t1). In this state, an inconsistent read of the replicated data object may occur because object 200c has not been updated by distributed storage system 106. More specifically, object 200c still reflects the old value v1 and last-modified timestamp t1. This inconsistency may be caused by various factors including but not limited to network delays and machine failures. If distributed storage system 106 were to retrieve value v1 from object 200c at state 2, this read would be an inconsistent read because v1 is not the most recent value that has been written to replicated data object 200. In other cases, distributed storage system 106 may retrieve v2 from object 200a or 200b at state 2, in which case the read operation would be a consistent read. In some embodiments, the possibility of an inconsistent read may occur as a result of distributed storage system providing guarantees of high availability and eventual consistency.

Eventual consistency may mean that replicated data objects may be guaranteed to reach a consistent state without any strong guarantees as to how much time may be required to reach such state. In some cases, even if a maximum inconsistency window can be maintained, the data and results may still be potentially inconsistent when within the window. In this example, state 3 (described below) represents reaching consistency in a system with eventual consistency semantics.

In state 3 (some time after state 2), distributed storage system 106 has completed performing all write operations for replicated data object 200. In this state, all values are consistent across objects 200*a-c*. For instance, the value of each object is v2 in state 3. Similarly, each last-modified timestamp has been updated to t5 at state 3. In various embodiments, consistency measurement component 100 described herein may be configured to detect and/or quantify the types of inconsistent reads described above with respect to state 2. This process is described in more detail below.

Note that the method or mechanism by which consistency is reached may vary in different embodiments. While FIG. 2 illustrates one type of inconsistency that may occur within the distributed storage system, embodiments are not limited to this type of inconsistency. For example, in some embodiments, at least some inconsistencies may be introduced by cache layer(s) 109 (or any other intermediate storage layer in the distributed storage system). For instance, inconsistencies may occur when data modifications in lower layers of the distributed storage system (e.g., storage nodes 110*a-n*) have yet to fully propagate to higher levels of the distributed storage system (e.g., a stale cache in cache layer(s) 109).

Figures 3, 4:
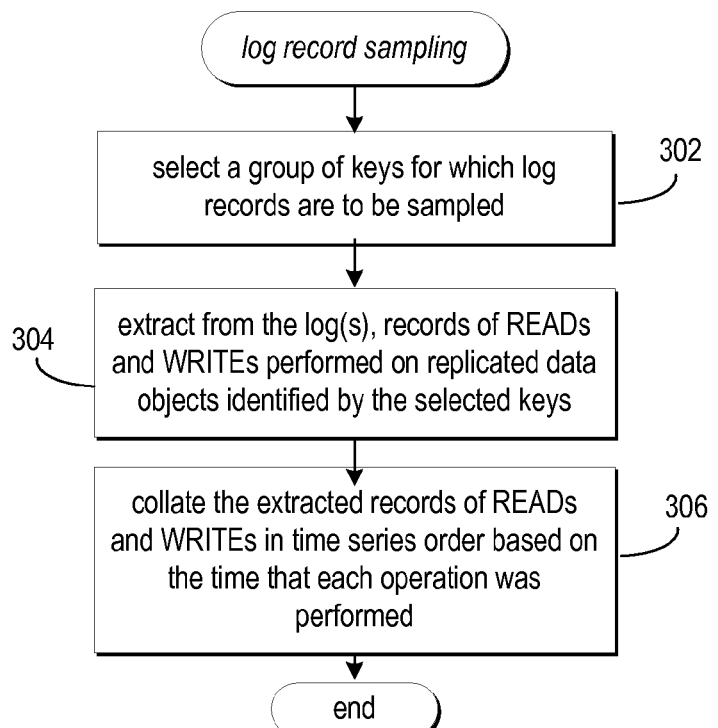
FIG. 3 illustrates a flowchart of an example method for sampling log records, according to some embodiments.
FIG. 4 illustrates a block diagram of an example sampled log file, according to some embodiments.

FIG. 3 illustrates an example method that may be performed to sample log records in preparation for read consistency measurement. In various instances, the methods herein are described as being performed by consistency measurement component 100. Consistency measurement component 100 may perform the illustrated method after performing the log collection illustrated in FIG. 1. It should be noted that in some embodiments, the methods may be performed by other components or systems, such as any computer similar to that of FIG. 14.

By sampling log records, the consistency measurement component 100 may reduce the quantity of computing resources (e.g., processor cycles and/or memory utilization) required to perform measure consistency of reads performed in a distributed storage system. At block 302, the method may begin with consistency measurement component 100 selecting a group of keys for which log records are to be sampled. As described above, a given key may identify a replicated data object stored within the distributed storage system 106. One example of such a key is described above with respect to k1 of FIG. 2. In various embodiments, different techniques may be utilized to actually select which keys to include in the group. In general, the group of keys selected at block 302 may be dependent upon the type of consistency metric desired. For instance, if a consistency metric for the entire distributed storage system 106 is desired, block 302 may include a random sampling of all keys managed by distributed storage system 106. In another example, if a consistency metric for a particular customer (e.g., a customer that purchases storage services provided by distributed storage system 106) is desired, the selected group of keys may be all keys associated with that customer's replicated data objects or a random sampling of such keys. In some cases, if a consistency metric for a specific replicated data object is desired, a single key that identifies that replicated data object may be selected at block 302 (instead of a group of keys). In other words, in some cases, the consistency metrics described herein may be determined for individual replicated data objects.

In some cases, embodiments may utilize composite keys, such as keys including prefixes or suffixes in addition to other information. For instance, in some embodiments, each key of a group of keys associated with a particular customer entity may include a prefix portion and an identifier portion. In this case, the prefix may be the same for each key of the group (e.g., the prefix may be common across all keys associated with the particular customer entity) while each key's identifier portion may be unique. In some embodiments, the identifier portion of each key may be globally unique. In other cases, the identifier portion may be unique only within the domain of keys sharing a common prefix.

At block 304, consistency measurement component 100 may extract from the collected logs, records of read operations (which may be referred to herein as "READs") and write operations (which may be referred to herein as "WRITEs") performed on replicated data objects identified by the selected keys. Examples of the records extracted are described in more detail below with respect to FIG. 4. At block 306, the consistency measurement component 100 may collate the extracted records of READs and WRITEs in time series order based on the time that each operation was performed. As described in more detail below, the time at which an operation was performed may be specified by the log record corresponding to that operation.

In various other embodiments, techniques other than those described with respect to FIG. 3 may be utilized to sample logs. In one non-limiting example, logs may be selected randomly (or pseudo-randomly) and embodiments may process such logs according to the techniques described herein to determine inconsistencies. In some cases, such as when logs are selected at random, there may be no guarantees regarding the distribution of log records (or keys) within the logs.

FIG. 4 illustrates one example of the sampled and collated log records that may result from consistency measurement component 100 performing the method of FIG. 3. Theses sampled and collated log records are illustrated as sampled log file 116, which may be the same as the like numbered element of FIG. 1. In the illustrated embodiment, each row of the sampled log file 116 represents a different record extracted from the logs collected from distributed storage system 106. For clarity of illustration, log records are shown for a group of three keys: k1, k2 and k3. This group of keys may correspond to the group of keys selected in block 302 of FIG. 3 described above. It should be understood that records may be sampled for any quantity of keys in other embodiments. In the illustrated embodiment, each row of the illustrated log file may correspond to a record sampled according to the techniques of FIG. 3. As illustrated each record may be collated in time series order. For example, each record includes a transaction timestamp (denoted as "TXN_TS"). This transaction timestamp specifies the time at which the respective operation was performed. For instance, the first record of the sampled log file indicates that a WRITE was performed at time t1. In the illustrated embodiment, the records are ordered top down according to ascending transaction time stamps. That is, t1 represents a time before t2, t2 represents a time before t3, and so on. The first record also indicates that the WRITE was performed on the replicated data object identified by key k1

For log records pertaining to READs, such as the third row of sampled log file 116, the transaction timestamp "TXN_TS" represents the time that the READ was performed. Log records for READs also indicate the key of the replicated data object from which a value is retrieved. In the third row of the sampled log file, this key is k1. For READs, log records also indicate a last-modified timestamp (denoted as "last_mod_TS"). The last-modified timestamp may specify, for the specific value retrieved during the READ, the time at which that value was last modified.

Figure 5:
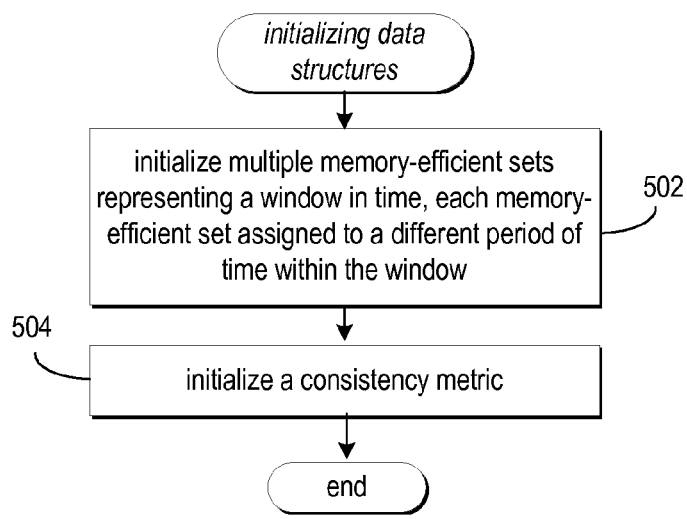
FIG. 5 illustrates a flowchart of an example method for initializing data structures for memory-efficient sets and consistency metrics, according to some embodiments.
Figure 6:
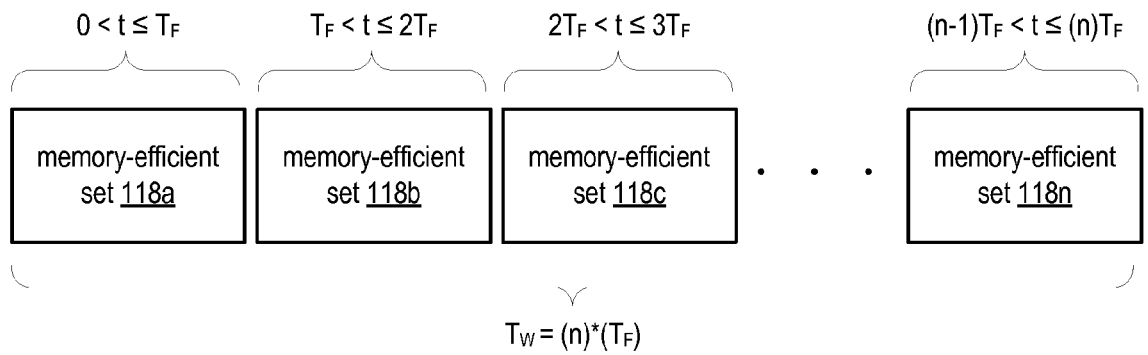
FIG. 6 illustrates a block diagram of a window of memory-efficient sets assigned to different time periods of operation, according to some embodiments.

In various embodiments, in order to measure consistency, consistency measurement component 100 may also utilize various data structures, such as memory-efficient sets 118 and consistency metric(s) 104 described above. FIG. 5 illustrates a method for data structure initialization. In block 502, consistency measurement component 100 may initialize multiple memory-efficient sets representing a window in time where each memory-efficient set is assigned to a different period of time within that window. In some embodiments, these different time periods may be non-overlapping. In other embodiments, at least some of the different time periods may overlap other time periods. FIG. 6 illustrates a logical representation of multiple memory-efficient sets 118a-n, each assigned to a different time period within time window T. In various embodiments the width of this time window may be equivalent to the product of "n" (which represents the number of sets) and $T_F$ (which represents the width of the time period assigned to each individual set). As illustrated, each memory-efficient set is assigned to a different time period within the time window. Memory-efficient set 118a is assigned to the time period $0<t\leq T_F$, memory-efficient set 118b is assigned to $T_F<t\leq 2T_F$, and so on. As described in more detail with respect to FIGS. 8-9, these sets and the corresponding time periods may be utilized to categorize WRITE operations into different periods of time. The window of memory-efficient sets may then be utilized to evaluate whether read operations are inconsistent.

Figure 7:
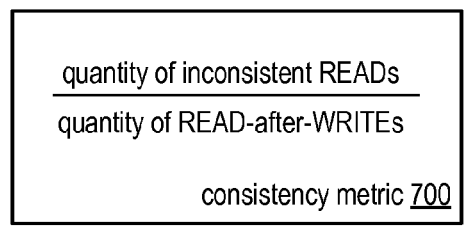
FIG. 7 illustrates an example data structure for a consistency metric, according to some embodiments.

As illustrated at block 504, the method may also include initializing a consistency metric. In general, the consistency metric may be any metric that is dependent upon the quantity of inconsistent reads detected within distributed storage system 106 for a given period of time (e.g., $T_W$) and a given group of replicated data objects (e.g., the group of objects corresponding to the keys selected at block 302). FIG. 7 includes one example of such a metric illustrated as consistency metric 700. Consistency metric 700 may include a numerator that includes a measure or estimation of the quantity of inconsistent READs detected within distributed storage system 106 for a given period of time and/or a given group of replicated data objects. Consistency metric 700 may also include a denominator that measures or estimates the quantity of READ-after-WRITEs that occur within distributed storage system 106. This ratio is one example of a consistency metric that may be generated by consistency measurement component 100 in various embodiments. As described in more detail below, due to sampling of log records, consistency metrics may be expressed as confidence intervals in some embodiments.

Figure 8:
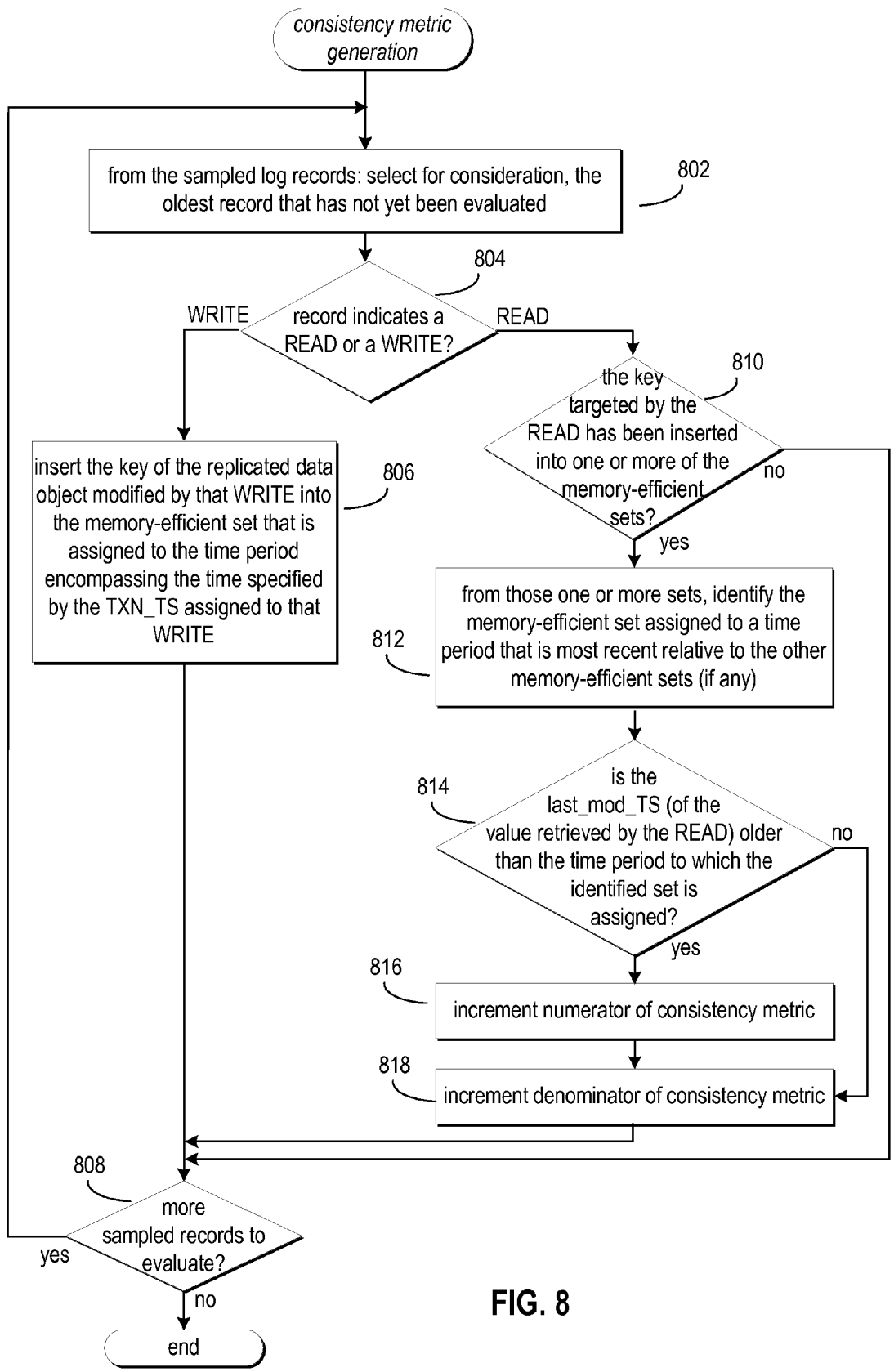
FIG. 8 illustrates a flowchart of an example method for generating a consistency metric, according to some embodiments.

FIG. 8 illustrates a flowchart of an example method for evaluating the sampled log records described above to generate a consistency metric. At block 802, from the sampled log records (e.g., sampled log file 116), consistency measurement component 100 selects for consideration, the oldest record that has not yet been evaluated. To use sampled log file 116 as an example, the first log record evaluated would be the log record specified by the first row, the second log record evaluated would be the log record specified by the second row, and so on. At block 804, consistency measurement component 100 determines whether the record indicates a READ or a WRITE. For WRITEs, consistency measurement component 100 proceeds to block 806 at which point the consistency measurement component 100 may insert the key of the replicated data object modified by that WRITE into the memory-efficient set that is assigned to the time period encompassing the time specified by the transaction time stamp assigned to that WRITE. As described in more detail below, as multiple iterations of block 806 are performed, the window of memory-efficient sets will effectively associate different WRITEs with different periods of time. This window may be used to evaluate whether READs are consistent, as described in more detail below. After performing block 806, the consistency measurement component 100 may perform block 808, which is described in more detail below.

If at block 804 consistency measurement component 100 determines that the record is a READ record, consistency measurement component 100 may proceed to block 810. At block 810, consistency measurement component 100 determines whether the key of the replicated data object targeted by the READ has already been inserted into one or more of the memory-efficient sets. In various embodiments, this may include testing or probing each of the memory-efficient sets, a process that is described in more detail below. In various embodiments, due to the nature of the memory-efficient sets, it may be determined that a key has been inserted into a set without that set actually storing the value of the key. Examples of these types of memory-efficient sets are described in more detail below with respect to FIG. 10.

As indicated by the negative output of block 810, if that key is not present in the window of memory-efficient sets, consistency measurement component 100 may perform block 808 (described below). As can be seen from the illustrated flowchart, block 810 effectively ensures that the consistency metric is based on READ-after-WRITE operations. For instance, if the READ pertains to a particular key, this portion of the method serves as a test to ensure that the key is present within the time window of the memory-efficient sets, which indicates that the replicated data object identified by that key has already been written to. If the key is not present within the window of multiple memory-efficient sets, consistency measurement component 100 proceeds to block 808, as illustrated by the negative output of block 810.

In various embodiments, if the distributed storage system is configured to provided bounded inconsistency, the window of memory-efficient sets may be sized to have a temporal width that ensures all (or nearly all) inconsistent read operations are detected. For example, if bounded inconsistency is characterized by a temporal width of x (e.g., all write operations are guaranteed to reach consistency within x quantity of time), sizing the window of memory-efficient sets to have a temporal width (e.g., (n) $T_f$ of FIG. 6) that is greater than x may ensure that all inconsistent read operations are detected. This technique is described in more detail below with respect to FIGS. 9A-F.

If the key in question has been inserted into at least one of the memory-efficient sets, consistency measurement component 100 may proceed to block 812 as illustrated by the positive output of block 810. In this portion of the method, consistency measurement component 100 may identify, from a candidate group of the one or more memory-efficient sets in which the key has been inserted, the memory-efficient sets assigned to a time period that is most recent relative to the other memory-efficient sets (if any). At block 814, consistency measurement component 100 determines whether the last-modified timestamp indicated by the read record specifies a time that is older that the time period to which the identified memory-efficient set is assigned. In various embodiments, this portion of the method may serve as a test to determine whether the value read from a replicated data object is older than the most recent WRITE performed on that replicated data object. If the last-modified timestamp is older than the time period of the most recent set that includes the key (i.e., if the value read during the READ is older than the most recent WRITE), consistency measurement component 100 may determine that the READ being evaluated is an inconsistent read. In these cases, consistency measurement component 100 may increment the numerator of the consistency metric, as illustrated at block 816. As described above with respect to FIG. 7, the numerator of the consistency metric represents a quantity of inconsistent READs. As illustrated at block 818, the consistency measurement component 100 will also increment the denominator of the consistency metric to indicate that the READ was determined to be a READ-after-WRITE operation. As described above, READs evaluated at blocks 812-814 have been verified to be READ-after-WRITE by virtue of passing the test of block 810.

In cases where it is determined that the last modified timestamp is not older than the time period of the most recent set that includes the key (i.e., in cases where the value read during the READ has not been determined to be older than the most recent WRITE), the method may proceed from block 814 to block 818. In this case, the denominator of the consistency metric is incremented to account for a READ-after-WRITE as described above. However, the numerator of the consistency metric is not incremented because the READ was not determined to be inconsistent in this case.

After block 818, consistency measurement component 100 may proceed to block 808 to determine whether there are more sampled records to evaluate. If not, the method may end. If there are more records to evaluate, the method proceeds loops back to block 802 and the method is repeated for the next record.

Figure 9A:
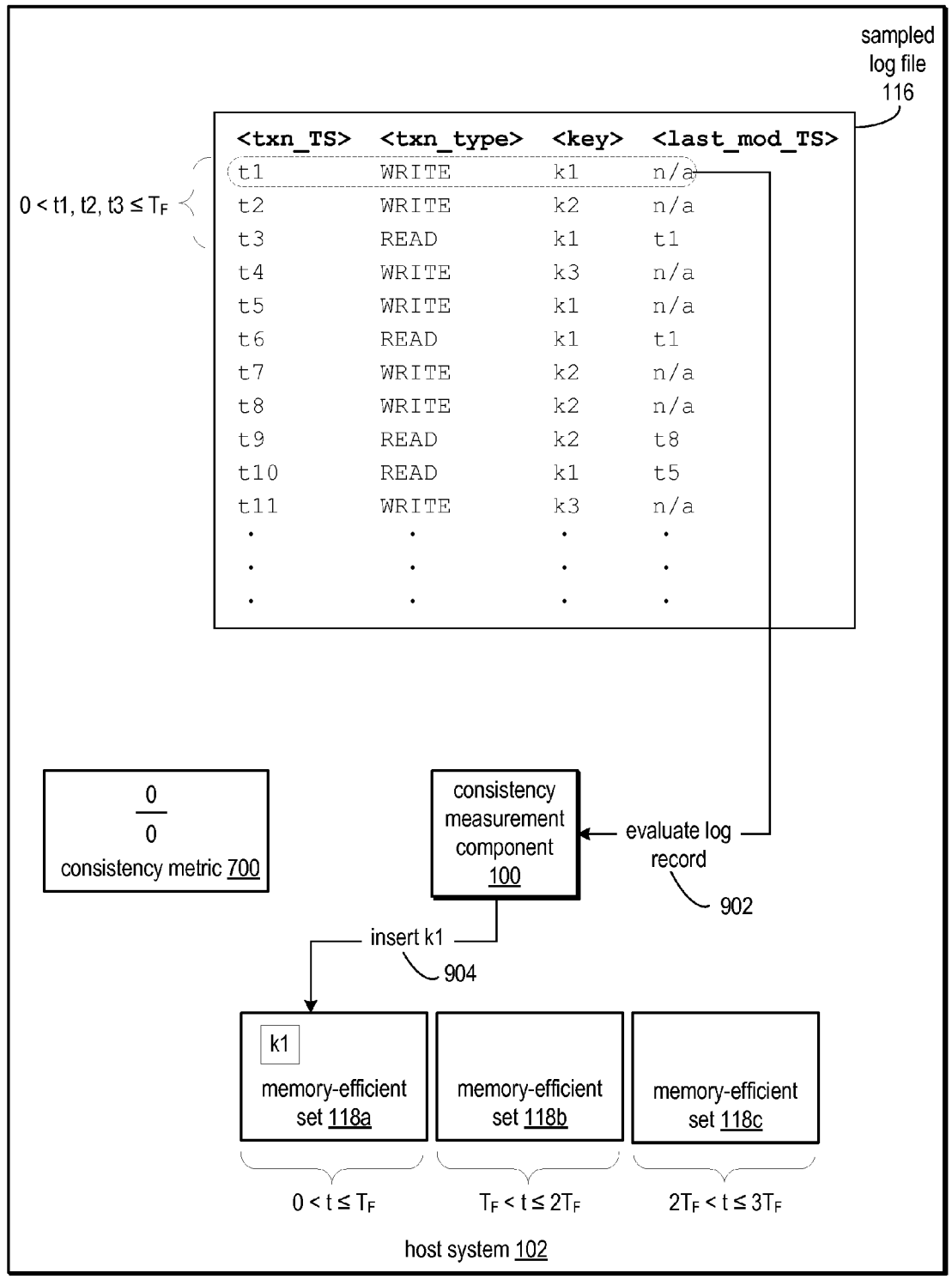
FIGS. 9A-F illustrate example flow diagrams for generating a consistency metric based on sampled log records and memory-efficient sets, according to some embodiments.

FIGS. 9A-9F include block diagrams illustrating an example of consistency measurement component 100 performing the method described above with respect to FIG. 8 in order to evaluate the sampled log records and generate a consistency metric. FIG. 9A illustrates host system 102 configured to implement consistency measurement component 100. In some embodiments, consistency measurement component 100 may be implemented as program instructions executing on one or more processors of host system 102. FIG. 9A also illustrates an initialized consistency metric 700, an example window of memory-efficient sets 118a-c, and sampled log file 116; each of these items may be stored in one or more memories of host system 102.

At 902, consistency measurement component 100 evaluates the oldest record of log file 116 that has not yet been evaluated (e.g., according to the techniques of 802 and 804). In the illustrated embodiment, this record is represented in the first row of the log file. At 904, after consistency measurement component 100 determines that the record is a WRITE record, consistency measurement component 100 inserts the key of that record into the particular memory-efficient set that is assigned to the time period inclusive of the time indicated by the WRITE's transaction timestamp. As illustrated, this time is t1 which occurs between 0 and $T_F$; accordingly, consistency measurement component 100 inserts the key k1 into memory-efficient set 118a, which is assigned to the time period $0 < t \leq T_F$ in this example. At this point, consistency measurement component 100 determines that there are additional records to evaluate (e.g., similar to 808 described above). Consistency measurement component 100 then evaluates the next log record, as shown in FIG. 9B.

Figure 9B:
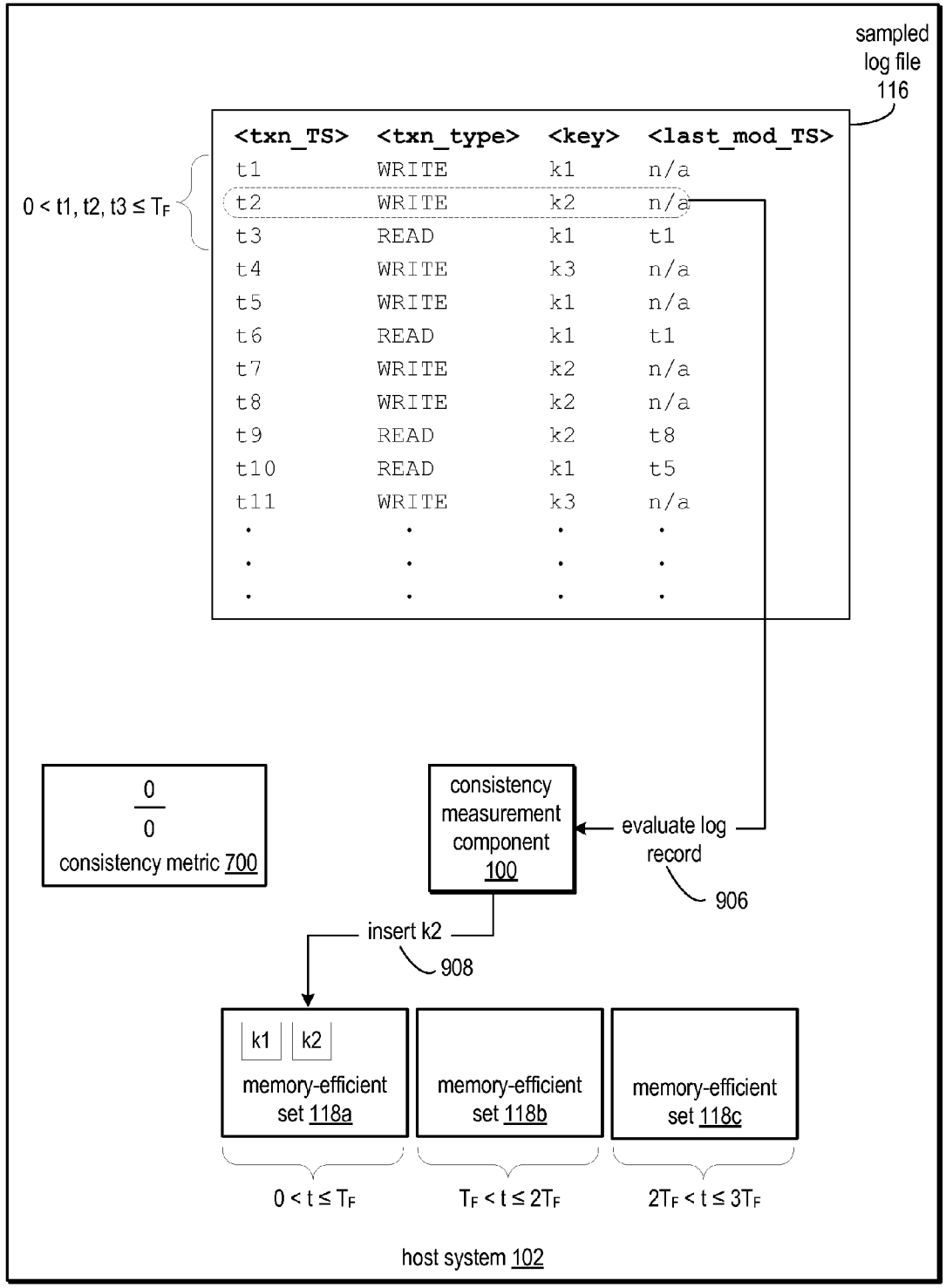

In FIG. 9B, consistency measurement component 100 again encounters a log record pertaining to a WRITE. In this case, consistency measurement component 100 evaluates the log record at 906 and inserts the key k2 into the appropriate memory-efficient set at 908. More specifically, as the transaction time stamp indicates the replicated data object identified by k2 was written to at time t2, consistency measurement component 100 inserts k2 into the memory-efficient set assigned to the time period inclusive of t2. In this case, that set is memory-efficient set 118a because time t2 falls between 0 and $T_F$. At this point, consistency measurement component 100 evaluates the next record of the log file, as illustrated in FIG. 9C.

Figure 9C:
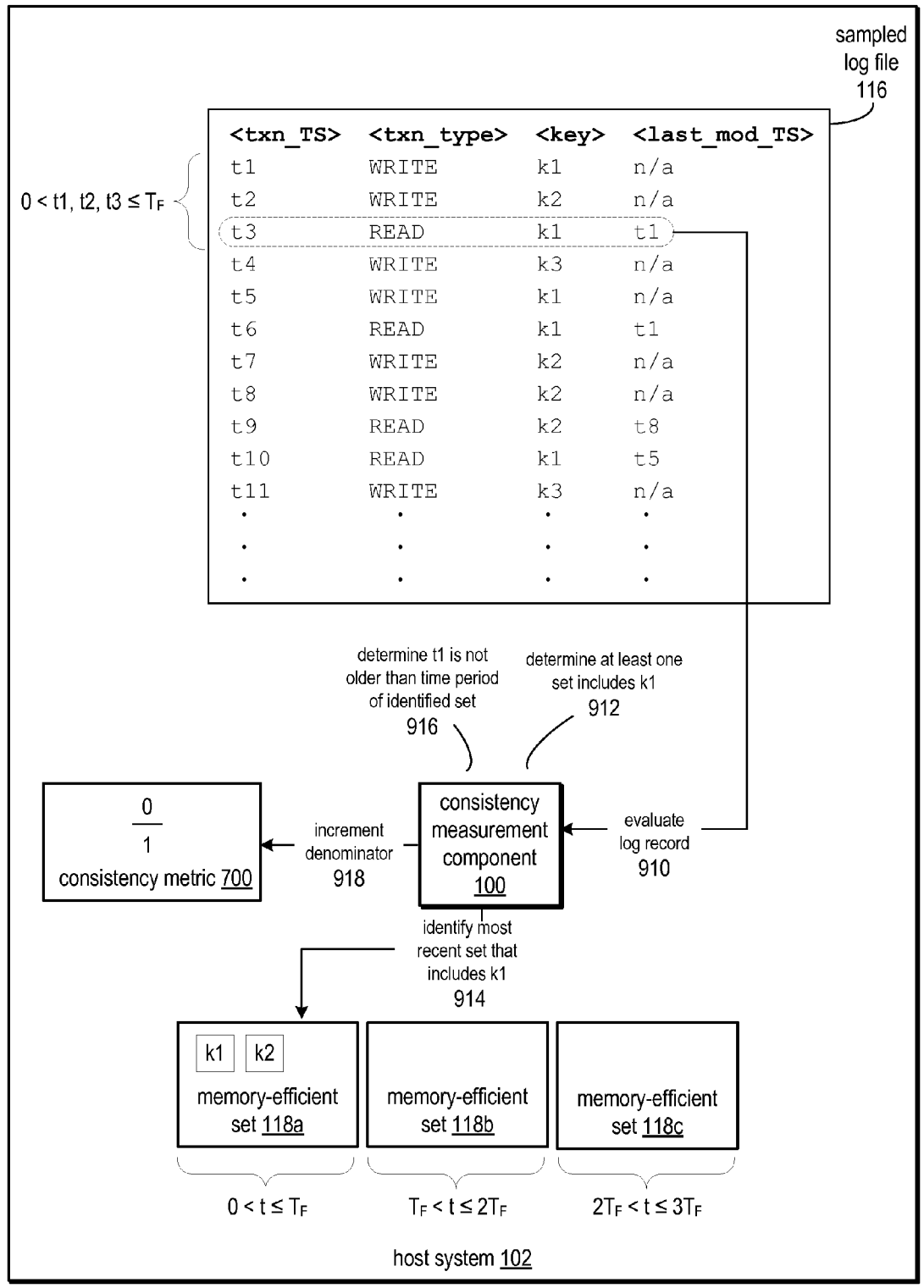

FIG. 9C illustrates consistency measurement component 100 evaluating a READ log record and updating the consistency metric accordingly (dependent on whether the READ is determined to be inconsistent). At 910, consistency measurement component 100 evaluates the third record of the log file 116 and determines that this record pertains to a READ. At 912, consistency measurement component 100 determines that at least one of memory-efficient sets includes the key of the READ record, which is key k1 in this case. For instance, consistency measurement component 100 may test or probe each of the sets (e.g., utilizing the techniques described below with respect to FIG. 10) to determine that key k1 has already been added to memory-efficient set 118a. By determining that key k1 has been inserted into memory-efficient set 118a, consistency measurement component 100 can rely on the knowledge that a WRITE was performed on the replicated data object that is identified by k1 at some point between time 0 and $T_F$. Consistency measurement component 100 may use this knowledge to determine whether the READ of the current log record is an inconsistent READ. At 914, since memory-efficient set 118a is the only set to contain key k1, consistency measurement component 100 may determine that this set is the most recent set that includes k1. At 916, consistency measurement component 100 determines that last-modified timestamp (t1) of the READ is not older than the time period of the identified set 118a (e.g., similar to block 814 described above). The determination consistency measurement component 100 performs at 916 indicates that the READ of the current log record was a consistent read. Accordingly, consistency measurement component 100 does not increment the numerator of consistency metric 700, which quantifies the instances in which an inconsistent READ is detected. At 918, consistency measurement component 100 does increment the denominator of consistency metric 700 as consistency measurement component 100 has determined that a READ-after-WRITE operation has been detected. At this point, consistency measurement component 100 evaluates the next record of the log file, as illustrated in FIG. 9D.

Figure 9D:
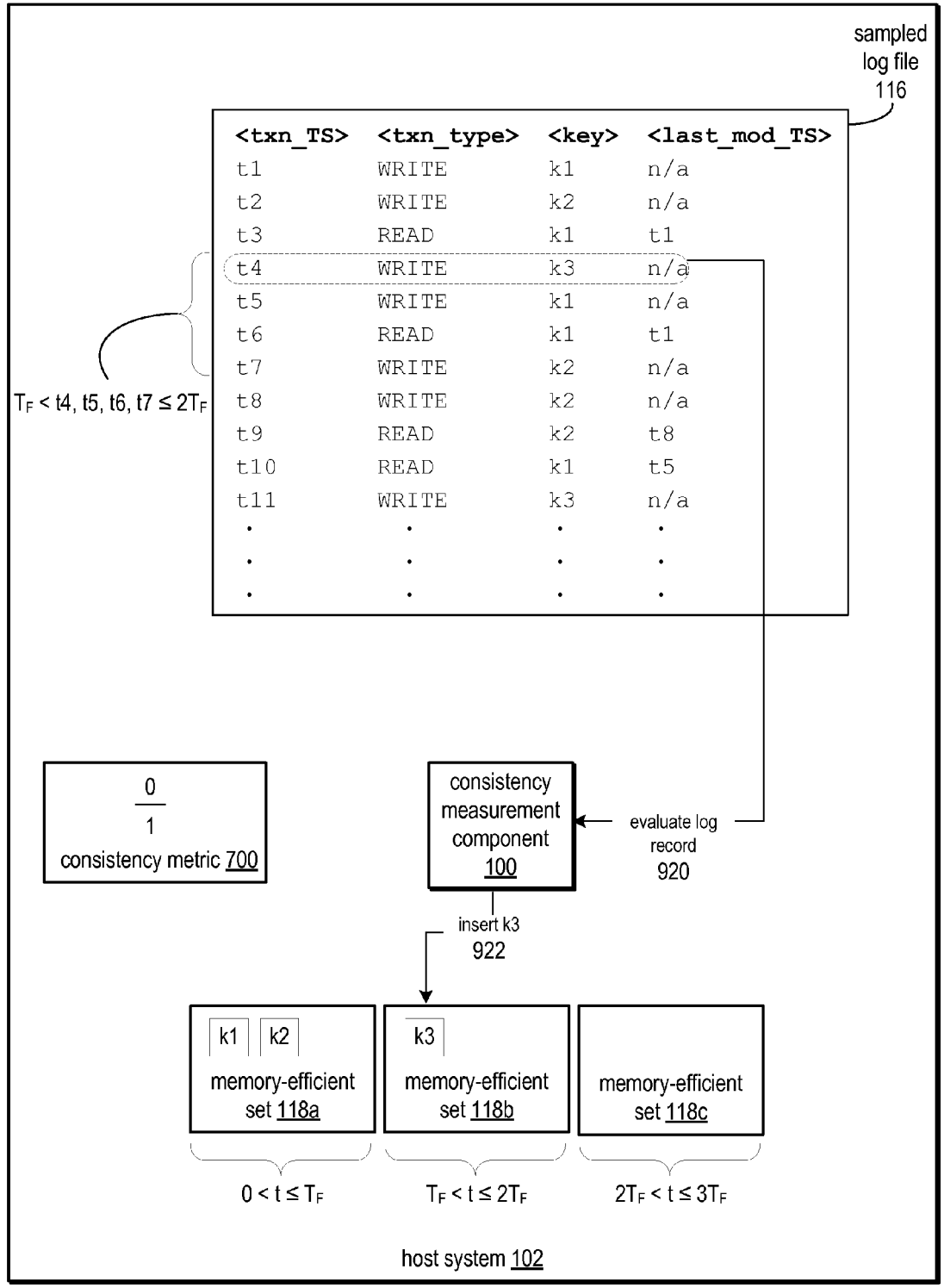

In FIG. 9D, consistency measurement component 100 performs an evaluation of another log record corresponding to a WRITE. At 920, similar to processing of the other WRITE log records above, consistency measurement component 100 evaluates the log record and determines that a WRITE has been encountered. Accordingly, consistency measurement component 100 inserts the key of the record (k3) into the appropriate memory-efficient set at 922. In the illustrated example, consistency measurement component 100 determines that the appropriate set is memory-efficient set 118b because the transaction timestamp of the log record indicates the WRITE was performed at a time (t4) that falls within the time period assigned to that set ($T_F < t \leq 2T_F$). At this point, consistency measurement component 100 evaluates the next record of the log file, as illustrated in FIG. 9D.

Figure 9E:
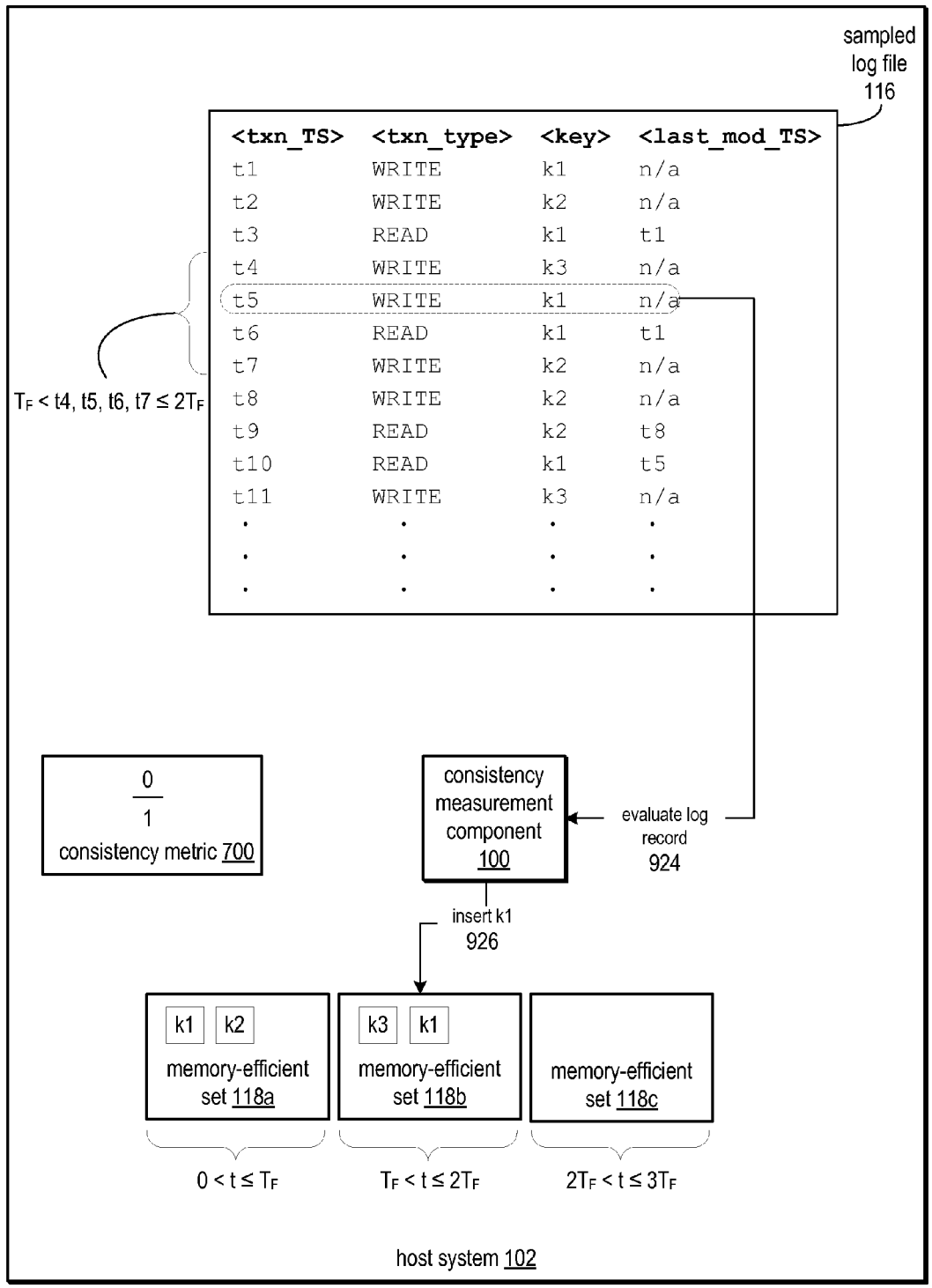

In FIG. 9E, consistency measurement component 100 performs an evaluation of another log record corresponding to a WRITE. At 924, similar to processing of the other WRITE log records above, consistency measurement component 100 evaluates the log record and determines that a WRITE has been encountered. Accordingly, consistency measurement component 100 inserts the key of the record (k1) into the appropriate memory-efficient set at 926. In the illustrated example, consistency measurement component 100 determines that the appropriate set is memory-efficient set 118b because the transaction timestamp of the log record indicates the WRITE was performed at a time (t5) that falls within the time period assigned to that set ($T_F < t \leq 2T_F$). At this point, consistency measurement component 100 evaluates the next record of the log file, as illustrated in FIG. 9F.

Figure 9F:
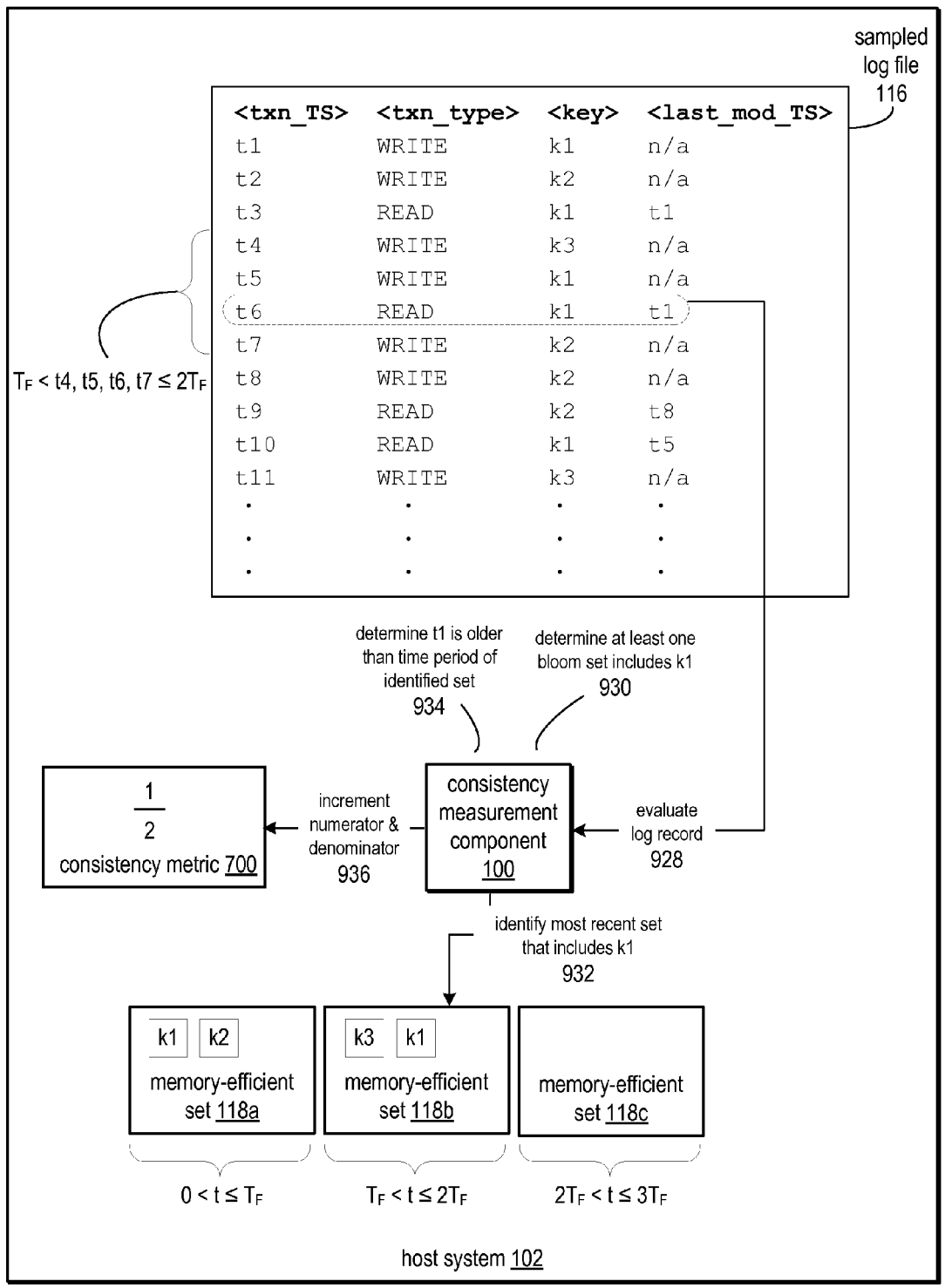

In FIG. 9F, consistency measurement component 100 detects the first inconsistent READ within sampled log file 116, as described in more detail below. At 928, consistency measurement component 100 evaluates the sixth record of the log file 116 and determines that this record pertains to a READ. At 930, consistency measurement component 100 determines that at least one of memory-efficient sets includes the key of the READ record, which is key k1 in this case. For instance, consistency measurement component 100 may test or probe each of the sets (e.g., utilizing the techniques described below with respect to FIG. 10) to determine that key k1 has already been added to both memory-efficient set 118*a* and memory-efficient set 118*b*. At 932, consistency measurement component 100 may identify memory-efficient set 118*b* as being the most recent memory-efficient set that contains k1 (e.g., since $T_F < t \leq 2T_F$ represents a time period later than $0 < t \leq T_F$). By identifying memory-efficient set 118*b* as being the most recent set in which key k1 has been inserted, consistency measurement component 100 can rely on the knowledge that a WRITE was performed on the replicated data object that is identified by k1 at some point between time $T_F$ and $2T_F$. Consistency measurement component 100 may use this knowledge to determine whether the READ of the current log record is an inconsistent READ. At 934, consistency measurement component 100 determines that the last-modified timestamp (a) of the READ is older than the time period of the identified set 118*b* (e.g., similar to block 814 described above). The determination consistency measurement component 100 performs at 934 indicates that the READ of the current log record was an inconsistent read because the READ operation of the current log record indicates that the retrieved value is older than the most recent write performed on the object identified by k1. At 936, consistency measurement component 100 increments the numerator of consistency metric 700, which quantifies the instances in which an inconsistent READ is detected. Also at 936, consistency measurement component 100 increments the denominator of consistency metric 700 as consistency measurement component 100 has determined that a READ-after-WRITE operation has been detected. At this point, consistency measurement component 100 evaluates the next record of the log file. Note that the illustrated consistency metric of "½" is merely an example. In some cases, the actual value of a consistency metric over multiple iterations may result in a very small number. For highly consistent systems, this metric may even approach a value close to zero. While not illustrated the process described above with respect to FIGS. 8 and 9A-F may be repeated for each of the remaining records of sampled log file 116. It should be noted that the quantity of log records evaluated in the above-described Figures is merely an example. In other cases, other quantities of records may be evaluated.

As described above, log records may be sampled from a larger population of log records. In various embodiments, consistency measurement component 100 may be configured to generate consistency metrics expressed in terms of confidence interval. In one non-limiting example, the population of logs may be considered to have a standard normal distribution. Based on this assumption, consistency measurement component 100 may generate consistency metrics expressed in terms of a confidence interval with some degree of certainty (e.g., 95% certainty).

As described above, a window of memory-efficient sets having a temporal width may be utilized to identify inconsistent read operations performed in the distributed storage system. In some embodiments, this window of memory-efficient sets may be utilized to ensure that all (or nearly all) inconsistent read operations are identified in the distributed storage system. For instance, embodiments may utilize a distributed storage system having bounded inconsistency. In these cases, neither full availability nor full consistency is guaranteed (e.g., a compromise is struck between full availability and full consistency). However, embodiments may ensure that all (or nearly all) inconsistent read operations are detected by sizing the window of memory-efficient sets to be larger than the temporal width of the distributed storage system's bounded inconsistency. In one non-limiting example, bounded inconsistency for the distributed storage system is one hour. (This may mean that, for a given write operation performed on a given replicated data object, the system can ensure that all instances of that replicated data object will be consistent within one hour from the initiation of that write operation.) In this example, if the window of memory-efficient sets is structured such that the temporal width of the window is greater than one hour (e.g., a temporal width of two hours), embodiments may ensure that all (or nearly all) inconsistent read operations will be detected.

Figure 10A:
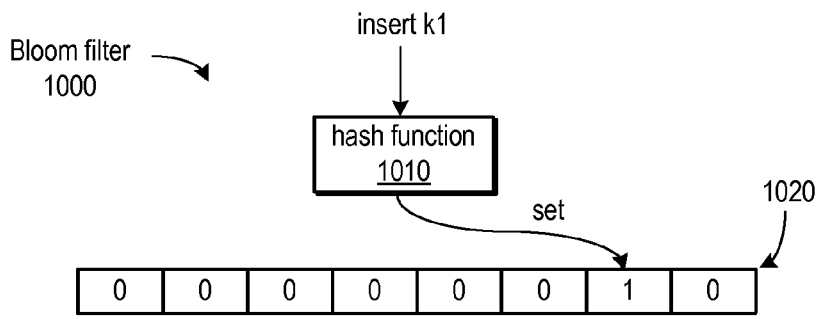
FIGS. 10A-D illustrate example techniques for inserting keys into Bloom filters and testing Bloom filters for the presence of certain keys, according to some embodiments.
Figure 10B:
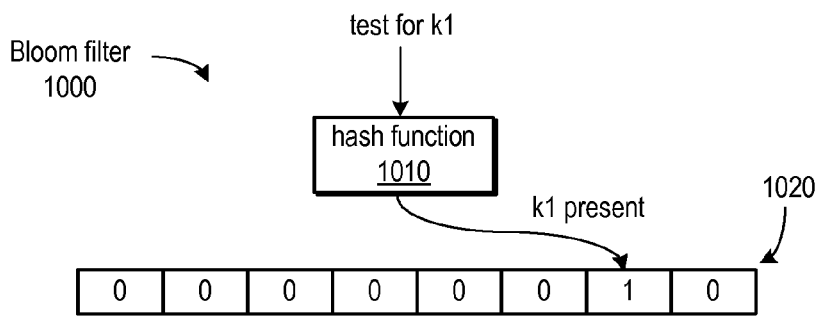
Figure 10C:
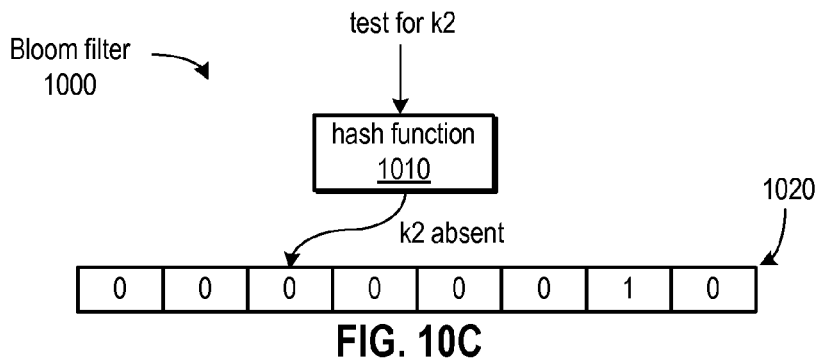

In various instances, the memory-efficient sets described herein may be described as "including" various keys. It should be noted that in various embodiments, the memory-efficient sets described herein may be data structures that do not actually store the values of such keys internally. Instead, in some embodiments, the memory-efficient sets may store an indication of which keys have been inserted into the sets without actually storing the values themselves. FIGS. 10A-D illustrate a Bloom filter 1000, which is one type of memory-efficient set that adheres to such properties. For example, FIG. 10A illustrates the insertion of a key k1 into a Bloom filter 1000. Bloom filter may include one or more of a hash function 1010 and a bit array 1020. In various embodiments, when a key such as k1 is inserted into the Bloom filter, hash function 1010 generate a hash of k1 which is mapped to a position within bit array 1020. As part of insertion, this bit array position may be set to one (1) to indicate that k1 has been added to the set of elements "included" in the Bloom filter (even though the actual value of k1 is not stored within the Bloom filter). At some later time, the Bloom filter may be tested to determine whether a key is a member of that Bloom filter's set. For instance, FIG. 10B illustrates a test of Bloom filter 1000 to determine whether k1 is "included" within the set (i.e., whether k1 is a member of the set). This test may include again hashing k1 to determine the appropriate position within the bit array. Once the appropriate position is determined, the contents at that location are tested. If a one (1) is present at that location, the test results in a determination that key k1 has already been inserted into the set (i.e., key k1 is a member of the set). Had a zero (0) been present, the test would have resulted in a determination k1 was not a member of that set's set of keys.

It should be noted that the Bloom filters may be constructed such that, in most instances, different keys will map to different bit array positions. For instance, in FIG. 10C, Bloom filter 1000 is tested for the presence of key k2. To perform the test, a hash of key k2 is generated. As illustrated, this hash maps to a different position within the bit array. Furthermore, this position is empty and thus it is determined that k2 has not been added to the set of keys within the Bloom filter.

Various properties of the Bloom filters (and other memory-efficient sets described herein) may contribute to their memory efficiency. One of such properties includes the fixed-size nature of the data structure. For instance, the size of bit array 1020 of the Bloom filter may be sized based on the memory constraints of the host system in which it is implemented (e.g., the memory of host system 102). In this way, generating records of the various keys that have been added to the sets may be performed without worrying about exceeding the memory resources on hand. Another property that contributes to the memory efficiency of the Bloom filters may include the fact that the data footprint of a bit array may be much smaller than the data footprint of an array of multiple-bit key values.

Figure 10D:
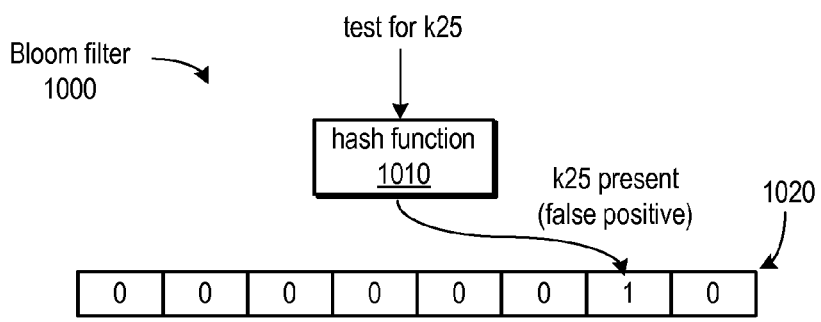

These memory-conserving properties also introduce certain tradeoffs into some embodiments, namely the chance of a "false positive" when querying a set for the presence of a key. FIG. 10D illustrates one such scenario. In FIG. 10D, Bloom filter 1000 is tested for the presence of key k25. Accordingly, key k25 is hashed and the corresponding bit-array position is determined. However, in this case, the bit array position for key k25 happens to be the same as the position of key k1. In this case, it will be erroneously determined that k25 has been inserted into the set of keys for Bloom filter 1000, when in reality key k25 has not been inserted into the set. In various embodiments, the false positive is caused by hash collision between keys k1 and k25. In various embodiments, the chance of a collision (and thus the chance of a false positive) may be mitigated by properly sizing the bit arrays of the Bloom filters. Typically, the larger the bit array, the smaller the chance of a collision between keys (and as such the smaller the chance of having a false positive in the membership containment test). Another technique that may be implemented may include the use of multiple hash functions for determining bit array positions for keys. For instance, if two hash functions were implemented for a given Bloom filter, each key would map to two different bit-array positions (one for each hash function). In these cases, for a key to be present within the Bloom filter, both bit-array positions would need to be occupied (e.g., set to "1").

In various embodiments, consistency measurement component 100 described herein may utilize any of the techniques described above with respect to FIGS. 10A-D for inserting keys into sets and/or testing for the presence of keys within sets. For instance, when consistency measurement component 100 inserts keys into sets as described above with respect to FIGS. 8 and 9A-9F, the techniques of FIGS. 10A-D may be utilized. Similarly, when consistency measurement component 100 probes through sets to determine the most recent set that includes a certain key as described above with respect to FIGS. 8 and 9A-9F, the techniques of FIGS. 10A-D may be utilized.

As time progresses during operation of consistency measurement component 100 and the distributed storage system, additional memory-efficient sets (e.g., Bloom filters) may be needed to store keys corresponding to additional WRITEs performed. In some cases, this may include generating additional memory-efficient sets within memory if available memory space permits. In other cases, the memory-efficient sets associated with the oldest time periods may be discarded (e.g., deleted) to free up memory space in which new sets may be generated. In yet other cases, memory efficient sets associated with the oldest time periods may be cleared of any keys and reassigned to a more recent time period. In some cases, this may serve to create a sliding window of sets that changes over time as new log data is processed. As described above, ensuring that the window of memory-efficient sets has a temporal width greater than the bounded inconsistency of the distributed storage system may ensure that the consistency measurement component detects all inconsistencies within the system. As such, the embodiments described above that generate new memory-efficient sets and/or reassign older memory-efficient sets to new time periods may also ensure that the total temporal width of the active window of memory-efficient sets remains larger than the bounded inconsistency of the distributed storage system.

FIG. 11 illustrates an example method for targeted consistency improvement. Various embodiments may include components (e.g., component 1202 of FIG. 12) configured to improve the consistency of replicated data objects. As these resources are not limitless, utilizing a targeted approach to consistency improvement may be an efficient way of utilizing the resources that are available. In various embodiments, the illustrated method may be performed by consistency measurement component 100 and/or consistency improvement component 1202.

As illustrated at block 1102, the method may include utilizing multiple memory-efficient sets to generate consistency metrics for different replicated data objects stored in the distributed storage system. In various embodiments, this portion of the method may include any of the techniques described above with respect to the generation of consistency metrics. At 1104, the method may include identifying a subset of the replicated data objects (within distributed storage system) having a consistency metric lower than that of one or more other replicated data objects. In various embodiments, consistency metrics may be evaluated for different customer entities of distributed storage system. For instance, in some cases, a common consistency metric may be generated for all of the replicated data objects of a given customer entity. The consistency metrics of different customer entities may be compared. In this example, data objects of the customer entities with the lowest consistency metrics may be targeted for consistency improvement before other customers. In other cases, consistency metrics may be segmented across different entities or items. For example, in various embodiments, consistency metrics may be generated for different data centers that include a portion of the distributed storage system, different hardware (e.g., a node, hard drive, or other storage device), or different batches of hardware. In one example, these consistency metrics may be utilized to identify poor consistency performance in a particular data center, a particular hardware device, or a particular batch of hardware devices (e.g., a batch of faulty hard drives).

As illustrated at block 1106, the method may include generating one or more instructions to improve the consistency of the identified subset of replicated data objects. In some cases, this may include generating an instruction that specifies the identified subset of data objects having poor consistency. This instruction may be provided to a consistency improvement component (described below). The consistency improvement component may then perform operations within the distributed storage system to improve the consistency of the identified subset. In other cases, this portion of the method may include providing consistency improvement instructions directly to distributed storage system.

FIG. 12 illustrates a block diagram that includes an example of targeted consistency improvement. In the illustrated example, consistency measurement component 100 may perform the method described above and provide an indication of the objects to target to consistency improvement component 1202, which may be implemented on a host system 1200. (In various embodiments, host system 1200 may be a computer similar to that of FIG. 14.) In other cases, consistency improvement component 1202 may perform the method directly to determine which replicated data objects are to be targeted. In any case, consistency improvement component 1202 may identify the replicated data objects within distributed storage system and update these replicated data objects to a consistent state. In the illustrated embodiment, objects within distributed storage system are represented as circles. Data objects targeted for consistency improvement are shown as darkened circles whereas other objects are not. It should be noted that in various embodiments multiple individual objects within distributed storage system may each represent a replicated data object. For example, replicated data object 1204 is replicated three times as three individual objects stored within distributed storage system. In various embodiments, these individual objects may be stored anywhere within distributed storage system (e.g., on different storage nodes).

To improve the consistency of replicated data object 1204, consistency improvement component 1202 may provide consistency improvement instructions to distributed storage system. In various embodiments, these instructions may achieve the following, which may be performed by consistency improvement component 1202 and/or nodes of distributed storage system 106. First, the various individual objects of replicated data object 1204 may be identified. These individual objects may be evaluated to determine that age of the values stored within them. For instance, the last-modified time stamp (e.g., as described above with respect to FIG. 2) of each object may specify a time at which a value within an object was last modified. These time stamps may be evaluated to determine which individual object includes a value that is most recent relative to the other objects of replicated data object 1204. Once this value is identified, it may be replicated within the other individual objects. After all of the individual objects have been updated, replicated data object 1204 may reside in a consistent state. This process may be repeated for other replicated data objects that have been targeted for improvement.

In various embodiments, consistency improvement techniques other than those described herein may be utilized. For instance, one type of consistency improvement technique implemented by consistency improvement component 1202 may include "anti entropy" techniques, such as those describe in U.S. Pat. No. 7,716,180, which is incorporated herein by reference in its entirety.

Figure 13:
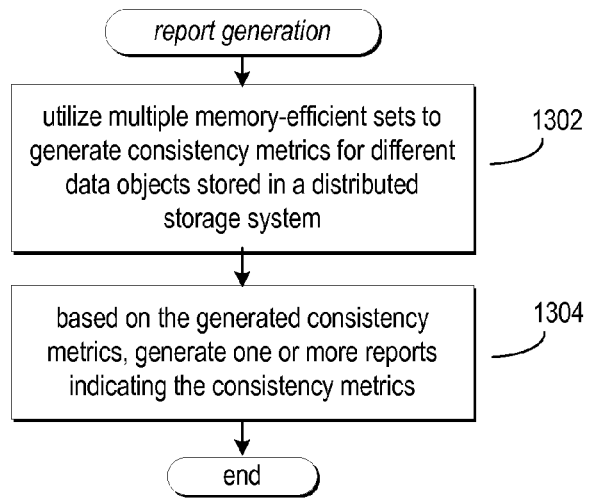
FIG. 13 illustrates a flowchart of an example method for generating reports based on consistency metrics, according to some embodiments.

In various embodiments, the consistency measurement component 100 may generate reports regarding the consistency of the distributed storage system. Such reports may be helpful in determining the impact of code and configuration changes to the distributed storage system. For instance, if a consistency report includes consistency metrics generated after a configuration change to distributed storage system, the report may provide useful information as to how the distributed storage system was impacted by the configuration change. FIG. 13 illustrates an example method for generating such reports. In various embodiments, the illustrated method may be performed by consistency measurement component 100. As illustrated by block 1302, the method may include utilizing multiple memory-efficient sets to generate consistency metrics for different data objects stored in distributed storage system. This portion of the method may utilize any of the techniques described above with respect to consistency metric generation. In various embodiments, block 1302 may be performed after a configuration change to distributed storage system (e.g., to see the impact of the changes within the report to be generated).

As illustrated at block 1304, the method may include, based on the generated consistency metrics, generating one or more reports indicating the consistency metrics. In various reports, such consistency metrics may be shown with respect to a period of time. For instance, a time-series plot of consistency metrics could be generated. These types of reports may be useful for monitoring the effects of different system changes over time. In some cases, reports may indicate customer-specific information. For instance, reports may specify different consistency metrics for data objects of different customers. If the data of a particular customer entity is experiencing poor consistency relative to other customer entities, extra resources can be dedicated to improving the consistency of that customer entity's data.

In addition to the reports described above, some embodiments may generate alerts if consistency metrics indicate a level of consistency that is less than a desired level of consistency. For instance, if consistency is exceptionally low for certain replicated data objects, the consistency measurement component may generate one or more alert messages that may be provided to management entities.

Example Computer System

Various embodiments of the system and method for targeted consistency improvement in a distributed storage system, as described herein, may be executed on one or more computer systems, which may interact with various other devices. Note that any component, action, or functionality described above with respect to FIGS. 1-13 may be implemented via one or more computer systems configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 and/or data 1432 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 implementing consistency measurement component 100 are shown stored within memory. Additionally, data 1432 of memory 1420 may store any of the information or data structures described above, such as consistency metrics 104, memory-efficient sets 118, and sampled log records 116. In some embodiments, program instructions and/or data may be received, sent or stored upon different types of computer-accessible media or on similar media separate from system memory 1420 or computer system 1400. While computer system 1400 is described as implementing the functionality of consistency measurement component 100, any of the components or systems illustrated above may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices (e.g., host system 1200 including consistency improvement component 1202 and distributed storage system 106 including storage nodes 110) attached to a network 1485 or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

Figure 14:
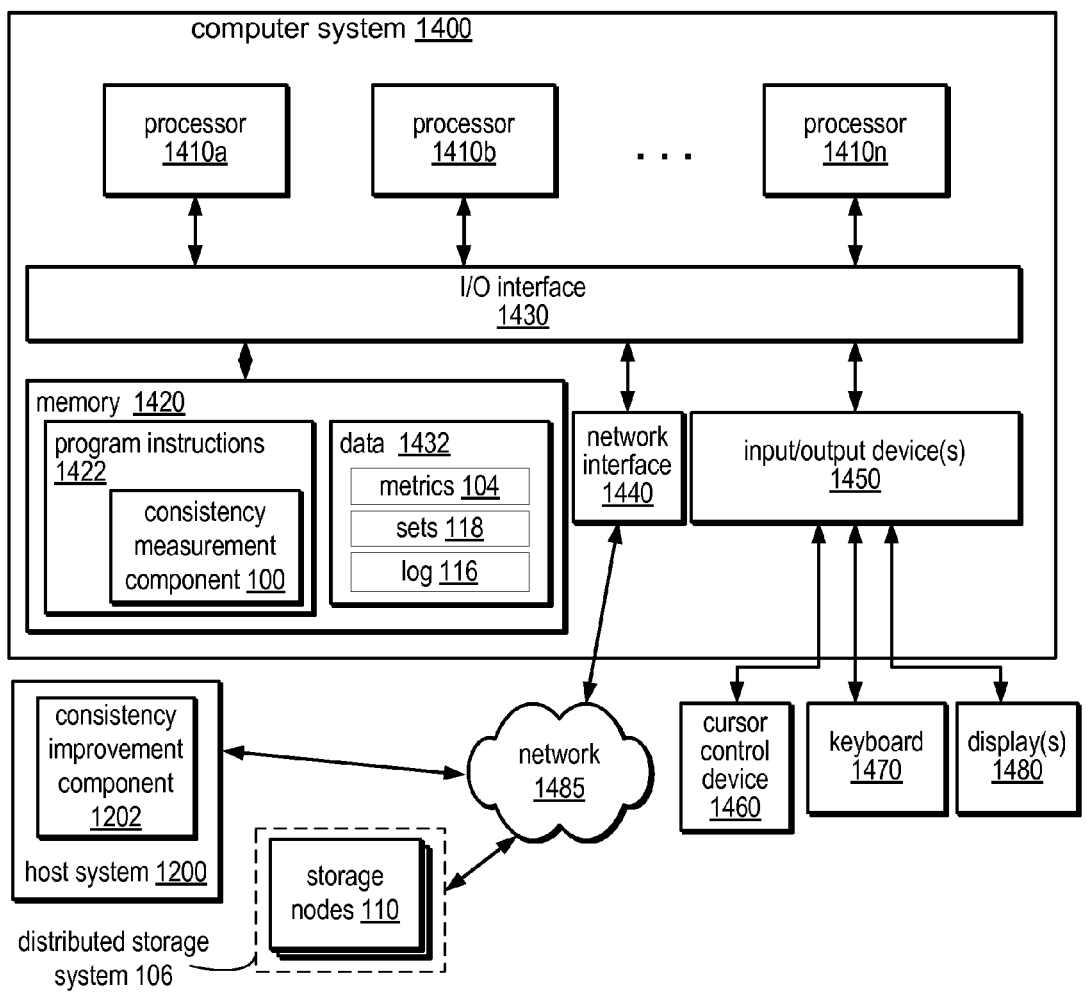
FIG. 14 illustrates one example of a computer system suitable for implementing various elements of the system and method for targeted consistency improvement in a distributed storage system, according to some embodiments.

As shown in FIG. 14, memory 1420 may include program instructions 1422 configured to implement any element or action described above. In one embodiment, the program instructions may implement the methods described above, such as the methods illustrated by FIGS. 3, 5, 8, 11 and 13. In other embodiments, different elements and data may be included. Note that data 1432 may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method for targeted consistency improvement within a distributed storage system, the method comprising:
utilizing multiple memory-efficient sets to generate consistency metrics for different replicated data objects stored within the distributed storage system, wherein the consistency metrics are based on a measure of inconsistent read operations performed on the replicated data objects;
wherein an inconsistent read operation includes retrieving from a replicated data object, a value that is older than the most recent write operation performed on that replicated data object;
identifying a subset of the replicated data objects having consistency metrics that indicate a lower level of consistency than the consistency metrics of other replicated data objects; and
for each given replicated data object of said subset:
identifying multiple individual data objects that represent the given replicated data object within the distributed data store;
identifying the individual data object storing a most recent value relative to values of the other individual data objects; and
writing the most recent value to each of the other individual data objects.

2. The computer-implemented method of claim 1, wherein the method comprises populating the memory-efficient sets with keys identifying replicated data objects of the distributed storage system, each key inserted into a memory-efficient set assigned to a time period in which a replicated data object identified by that key was written to.

3. The computer-implemented method of claim 2, wherein utilizing multiple memory-efficient sets to generate a given consistency metric for a given replicated data object comprises:
for each given read operation of multiple read operations performed on the given replicated data object: comparing a last-modified time at which a value retrieved during that read operation was last modified to a time period assigned to a memory-efficient set that includes the key of the given replicated data object;
if the last modified time is older than the most recent time that a write operation was performed, determining that the value retrieved is inconsistent with a most recent value written to the given replicated data object; and
generating the consistency metric for the given replicated data object based on a quantity of instances in which retrieved values are determined to be inconsistent.

4. The computer-implemented method of claim 1, wherein each memory-efficient set is configured to provide an indication of which keys have been inserted into that set without storing the values of those keys.

5. The computer-implemented method of claim 1, wherein one or more of the memory-efficient sets are Bloom filters.

6. The computer-implemented method of claim 1, wherein one or more of the memory-efficient sets have a fixed data size within memory of a computer.

7. The computer-implemented method of claim 1, wherein the identified subset of the replicated data object comprises replicated data objects associated with a common customer entity, data center, node, hardware device, or batch of hardware devices.

8. The computer-implemented method of claim 1, wherein the method comprises determining that one or more of the consistency metrics indicate a level of consistency that is less than a desired level of consistency, and generating an alert in response to that determination.

9. The computer-implemented method of claim 1, wherein the method comprises generating at least some of the consistency metrics subsequent to a configuration change within the distributed storage system, and generating a report specifying one or more of the generated consistency metrics.

10. A computer-readable storage medium, storing program instructions computer-executable on a computer system to:
utilize multiple memory-efficient sets to generate consistency metrics for different replicated data objects stored within a distributed storage system, wherein the consistency metrics are based on a measure of inconsistent read operations performed on the replicated data objects; wherein an inconsistent read operation includes retrieving from a replicated data object, a value that is older than the most recent write operation performed on that replicated data object;
identify a subset of the replicated data objects having consistency metrics that indicate a lower level of consistency than the consistency metrics of other replicated data objects; and
for each given replicated data object of said subset, perform one or more operations to improve the data consistency of that replicated data object.

11. The computer-readable storage medium of claim 10, wherein the program instructions are configured to populate the memory-efficient sets with keys identifying replicated data objects of the distributed storage system, each key inserted into a memory-efficient set assigned to a time period in which a replicated data object identified by that key was written to.

12. The computer-readable storage medium of claim 11, wherein to utilize multiple memory-efficient sets to generate a given consistency metric for a given replicated data object the program instructions are configured to:
for each given read operation of multiple read operations performed on the given replicated data object: compare a last-modified time at which a value retrieved during that read operation was last modified to a time period assigned to a memory-efficient set that includes the key of the given replicated data object;
if the last modified time is older than the most recent time that a write operation was performed, determine that the value retrieved is inconsistent with a most recent value written to the given replicated data object; and
generate the consistency metric for the given replicated data object based on a quantity of instances in which retrieved values are determined to be inconsistent.

13. The computer-readable storage medium of claim 10, wherein each memory-efficient set is configured to provide an indication of which keys have been inserted into that set without storing the values of those keys.

14. The computer-readable storage medium of claim 10, wherein one or more of the memory-efficient sets are Bloom filters.

15. The computer-readable storage medium of claim 10, wherein one or more of the memory-efficient sets have a fixed data size within memory of the computer.

16. The computer-readable storage medium of claim 10, wherein the identified subset of the replicated data object comprises replicated data objects associated with a common customer entity, data center, node, hardware device, or batch of hardware devices.

17. The computer-readable storage medium of claim 10, wherein the program instructions are configured to determine that one or more of the consistency metrics indicate a level of consistency that is less than a desired level of consistency, and generate an alert in response to that determination.

18. The computer-readable storage medium of claim 10, wherein the program instructions are configured to generate at least some of the consistency metrics subsequent to a configuration change within the distributed storage system, and generate a report specifying one or more of the generated consistency metrics.

19. A system, comprising:
- a memory; and
- one or more processors coupled to the memory, wherein the memory comprises program instructions executable by the one or more processors to:
  - utilize multiple memory-efficient sets to generate consistency metrics for different replicated data objects stored within a distributed storage system, wherein the consistency metrics are based on a measure of inconsistent read operations performed on the replicated data objects; wherein an inconsistent read operation includes retrieving from a replicated data object, a value that is older than the most recent write operation performed on that replicated data object;
  - identify a subset of the replicated data objects having consistency metrics that indicate a lower level of consistency than the consistency metrics of other replicated data objects; and
  - provide an indication of the replicated data objects within said subset to a consistency improvement component configured to improve consistency of replicated data objects.

20. The system of claim 19, wherein the program instructions are configured to populate the memory-efficient sets with keys identifying replicated data objects of the distributed storage system, each key inserted into a memory-efficient set assigned to a time period in which a replicated data object identified by that key was written to.

21. The system of claim 20, wherein to utilize multiple memory-efficient sets to generate a given consistency metric for a given replicated data object the program instructions are configured to:
- for each given read operation of multiple read operations performed on the given replicated data object: compare a last-modified time at which a value retrieved during that read operation was last modified to a time period assigned to a memory-efficient set that includes the key of the given replicated data object;
- if the last modified time is older than the most recent time that a write operation was performed, determine that the value retrieved is inconsistent with a most recent value written to the given replicated data object; and
- generate the consistency metric for the given replicated data object based on a quantity of instances in which retrieved values are determined to be inconsistent.

22. The system of claim 19, wherein each memory-efficient set is configured to provide an indication of which keys have been inserted into that set without storing the values of those keys.

23. The system of claim 19, wherein one or more of the memory-efficient sets are Bloom filters.

24. The system of claim 19, wherein one or more of the memory-efficient sets have a fixed data size within memory of the computer.

25. The system of claim 19, wherein the identified subset of the replicated data object comprises replicated data objects associated with a common customer entity, data center, node, hardware device, or batch of hardware devices.

26. The system of claim 19, wherein the program instructions are configured to determine that one or more of the consistency metrics indicate a level of consistency that is less than a desired level of consistency, and generate an alert in response to that determination.

27. The system of claim 19, wherein the program instructions are configured to generate at least some of the consistency metrics subsequent to a configuration change within the distributed storage system, and generate a report specifying one or more of the generated consistency metrics.

* * * * *